(12) United States Patent
Williams et al.

(10) Patent No.: US 12,377,881 B2
(45) Date of Patent: Aug. 5, 2025

(54) DELIVERY HAND OFF PROCEDURE WHEN ELECTRIC VEHICLE (EV) IS ABOUT TO LOSE POWER

(71) Applicant: STATE FARM MUTUAL AUTOMOBILE INSURANCE COMPANY, Bloomington, IL (US)

(72) Inventors: Aaron Williams, Congerville, IL (US); Joseph Robert Brannan, Bloomington, IL (US); John Donovan, Bloomington, IL (US); Brian N. Harvey, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 287 days.

(21) Appl. No.: 17/864,269

(22) Filed: Jul. 13, 2022

(65) Prior Publication Data

US 2023/0415785 A1    Dec. 28, 2023

Related U.S. Application Data

(60) Provisional application No. 63/356,782, filed on Jun. 29, 2022, provisional application No. 63/355,894, filed on Jun. 27, 2022.

(51) Int. Cl.
*B60W 60/00* (2020.01)
*B60L 53/00* (2019.01)
(Continued)

(52) U.S. Cl.
CPC ....... *B60W 60/00256* (2020.02); *B60L 53/00* (2019.02); *B60L 58/14* (2019.02);
(Continued)

(58) Field of Classification Search
CPC ....... B60W 60/00256; B60W 2556/65; B60W 2510/244; B60L 53/00; B60L 58/14;
(Continued)

(56) References Cited

U.S. PATENT DOCUMENTS 7,480,505 B2    1/2009    Choi et al.
8,346,259 B2    1/2013    Xie et al.
(Continued)

FOREIGN PATENT DOCUMENTS

EP    3121774 A1 *    1/2017    ......... G06K 7/10366
EP    3239686 A1    11/2017
(Continued)

OTHER PUBLICATIONS

English translation of WO-2021015663-A1 (Year: 2021).*
(Continued)

*Primary Examiner* — Navid Z. Mehdizadeh
*Assistant Examiner* — Matthew Ho
(74) *Attorney, Agent, or Firm* — MARSHALL, GERSTEIN & BORUN LLP

(57) ABSTRACT

Methods and systems for power transfer and routing in a compartmentalized electric vehicle (EV) having detachable compartments, and for handing off a load from one EV to another EV for delivering the load to a destination are described herein. Each detachable compartment in the compartmentalized EV may have a separate power supply, motor, set of wheels, and/or autonomous operation features. The detachable compartments may attach to each other, such that each of the detachable compartments combine to form a compartmentalized EV that travels to a particular location.

14 Claims, 13 Drawing Sheets

(51) Int. Cl.
  *B60L 58/14* (2019.01)
  *B62D 63/02* (2006.01)
  *B62D 65/04* (2006.01)
  *B62D 65/14* (2006.01)
  *G01C 21/34* (2006.01)

(52) U.S. Cl.
  CPC .......... *B62D 63/025* (2013.01); *B62D 65/04* (2013.01); *B62D 65/14* (2013.01); *G01C 21/3438* (2013.01); *G01C 21/3469* (2013.01); *B60L 2200/28* (2013.01); *B60L 2240/54* (2013.01); *B60W 2510/244* (2013.01); *B60W 2556/65* (2020.02)

(58) Field of Classification Search
  CPC ............. B60L 2200/28; B60L 2240/54; B62D 63/025; B62D 65/04; B62D 65/14; G01C 21/3438; G01C 21/3469
  See application file for complete search history.

(56) References Cited

U.S. PATENT DOCUMENTS

| | | | |
|---|---|---|---|
| 8,981,716 B2 | 3/2015 | Bianco | |
| 9,283,953 B2 | 3/2016 | Suzuki | |
| 9,487,208 B2 | 11/2016 | Ogawa | |
| 9,499,161 B2 | 11/2016 | Ogawa | |
| 9,830,748 B2 | 11/2017 | Rosenbaum | |
| 9,990,782 B2 | 6/2018 | Rosenbaum | |
| 10,065,634 B2 | 9/2018 | Fukuda | |
| 10,269,190 B2 | 4/2019 | Rosenbaum | |
| 10,467,824 B2 | 11/2019 | Rosenbaum | |
| 10,513,253 B2 | 12/2019 | Kuwahara et al. | |
| 10,514,690 B1* | 12/2019 | Siegel | G05D 1/0027 |
| 11,227,452 B2 | 1/2022 | Rosenbaum | |
| 11,407,410 B2 | 8/2022 | Rosenbaum | |
| 11,524,707 B2 | 12/2022 | Rosenbaum | |
| 11,594,083 B1 | 2/2023 | Rosenbaum | |
| 2005/0003927 A1 | 1/2005 | Asakawa et al. | |
| 2013/0020398 A1 | 1/2013 | Goto et al. | |
| 2014/0229048 A1 | 8/2014 | Kawata et al. | |
| 2016/0185246 A1 | 6/2016 | Paul | |
| 2016/0221567 A1 | 8/2016 | Ogawa | |
| 2016/0257301 A1 | 9/2016 | Ogawa | |
| 2016/0325727 A1 | 11/2016 | Ogawa | |
| 2017/0361717 A1 | 12/2017 | Qin et al. | |
| 2018/0240047 A1 | 8/2018 | Mu et al. | |
| 2018/0241234 A1* | 8/2018 | Liang | B60L 53/65 |
| 2019/0256113 A1 | 8/2019 | Filippone | |
| 2019/0285424 A1* | 9/2019 | Imai | G06Q 10/08 |
| 2019/0304044 A1* | 10/2019 | Guo | G06Q 10/083 |
| 2021/0162883 A1 | 6/2021 | Shinohara et al. | |
| 2021/0256467 A1 | 8/2021 | Zuckerman et al. | |
| 2021/0302184 A1* | 9/2021 | Hayama | G01C 21/343 |
| 2021/0408820 A1 | 12/2021 | Koenen et al. | |
| 2022/0092893 A1 | 3/2022 | Rosenbaum | |
| 2022/0163344 A1 | 5/2022 | Pandit et al. | |
| 2022/0340148 A1 | 10/2022 | Rosenbaum | |
| 2023/0060300 A1 | 3/2023 | Rosenbaum | |
| 2024/0001925 A1* | 1/2024 | Shin | B60L 58/13 |

FOREIGN PATENT DOCUMENTS

| | | | | |
|---|---|---|---|---|
| EP | 3578433 B1 | 8/2020 | | |
| EP | 3730375 B1 | 10/2021 | | |
| EP | 3960576 A1 | 3/2022 | | |
| EP | 4190659 A1 | 6/2023 | | |
| EP | 4190660 A1 | 6/2023 | | |
| JP | 2012121700 A * | 6/2012 | | |
| JP | 2020056683 A * | 4/2020 | ......... | G01C 21/3438 |
| WO | WO-2021015663 A1 * | 1/2021 | | |

OTHER PUBLICATIONS

English translation of JP-2020056683-A (Year: 2020).*
English translation of JP-2012121700-A (Year: 2012).*
English translation of EP-3121774-A1 (Year: 2017).*
U.S. Appl. No. 17/864,261, filed Jul. 13, 2022.
Office Action for U.S. Appl. No. 17/864,261 dated Jul. 16, 2024.
TomoNews Sci & Tech, "Self-driving vehicle delivery: Ford unveils autonomous van equipped with delivery drones—TomoNews", Mar. 1, 2017, Youtube, https://www.youtube.com/watch?v=9JqC9x68GGY, retrieved on Jul. 5, 2024. (Year: 2017).
Office Action for U.S. Appl. No. 17/864,261 dated Dec. 11, 2024.

* cited by examiner

DELIVERY HAND OFF PROCEDURE WHEN ELECTRIC VEHICLE (EV) IS ABOUT TO LOSE POWER

CROSS-REFERENCE TO RELATED APPLICATIONS

This application claims priority to and the benefit of the filing date of (1) provisional U.S. Patent Application No. 63/355,894 entitled "Compartmentalized Electric Vehicle (EV) Having Attached Compartments with Separate Power Systems," filed on Jun. 27, 2022; and (2) provisional U.S. Patent Application No. 63/356,782 entitled "Compartmentalized Electric Vehicle (EV) Having Attached Compartments with Separate Power Systems," filed on Jun. 29, 2022. The entire contents of each of which is hereby expressly incorporated herein by reference.

FIELD

The present disclosure generally relates to electric vehicles (EVs), and more specifically, a compartmentalized EV having detachable compartments and a delivery hand off method when an EV delivering a load is running out of power.

BACKGROUND

Vehicles are typically powered using electricity, gasoline, and/or a hybrid of the two. When a vehicle is running low on power and does not have enough range to reach the nearest fueling and/or charging station, the vehicle may need emergency services, such as a tow truck to assist the vehicle in reaching the nearest fueling and/or charging station.

Furthermore, manually operated vehicles may deliver loads, such as packages, from shipping locations to recipient locations. In some scenarios, manually operated vehicles deliver several loads in the same trip when each load is going to the same location or geographic area. The manually operated vehicles may travel from one centrally located transportation hub to another transportation hub. Then additional vehicles may obtain the loads from the centrally located transportation hub and drop them off at the recipient locations.

When a vehicle delivering a load runs out of power on the route to the recipient location, the load may be not be delivered on time or may not be delivered to the recipient location at all. Conventional vehicles and techniques may have additional inefficiencies, inadequacies, ineffectiveness, and/or other drawbacks as well.

BRIEF SUMMARY

The present embodiments may be related to, inter alia, electric vehicles and/or autonomous or semi-autonomous vehicle operation, including driverless operation of fully autonomous vehicles. The embodiments described herein may relate particularly to various aspects of communication between autonomous operation features, components, and software. Specific systems and methods are summarized below. The methods and systems summarized below may include additional, less, or alternate actions, including those discussed elsewhere herein.

In one aspect, a compartmentalized electric vehicle (EV) may have a plurality of attached compartments each configured to operate separately from other compartments. The EV may include: a plurality of detachable compartments. Each detachable compartment may include: (i) a power supply; (ii) a motor; (iii) a set of wheels; and/or (iv) one or more autonomous operation features. The plurality of detachable compartments may be attached to each other to travel to a same location. The compartmentalized EV may include additional, less, or alternate actions and functionality, including that discussed elsewhere herein.

For instance, a first compartment of the plurality of compartments may be configured to receive power from a second compartment of the plurality of compartments to charge the power supply in the first compartment. The compartmentalized EV may travel to an intermediate destination. Two or more of the plurality of detachable compartments may be configured to detach from the compartmentalized EV, and travel to different final destinations.

In some scenarios, a first detachable compartment may include (i) a first load to be delivered to a first final destination, and (ii) a second detachable compartment may include a second load to be delivered to a second final destination.

Each of the plurality of detachable compartments may further include a magnet attached to an external surface of the compartment. The plurality of detachable compartments may be attached to each other via magnetic attraction from the magnets.

In some embodiments, each compartment may be configured to detach from the compartmentalized EV by de-energizing the magnet attached to the external surface of the compartment. In other embodiments, each compartment may be configured to detach from the compartmentalized EV by accelerating by more than a threshold acceleration in a direction opposite a direction of attachment to the compartmentalized EV In some embodiments, each detachable compartment may further include: (i) one or more processors and/or associated transceivers; and/or (ii) a non-transitory computer-readable medium storing instructions thereon.

Also in some embodiments, the instructions, when executed by the one or more processors, may cause the one or more processors to: (i) determine an amount of charge remaining for powering the compartment; (ii) obtain indications of amounts of charge remaining for powering other compartments in the EV; and/or (iii) transfer at least some of the charge remaining for powering the compartment to another compartment based upon the amount of charge remaining for powering the other compartment or the amount of charge remaining for powering the compartment.

In some embodiments, the instructions may cause the one or more processors to transfer at least some of the charge remaining for powering the compartment to the other compartment in response to determining at least one of: (i) the amount of charge remaining for powering the compartment is above a first threshold charge level; and/or (ii) the amount of charge remaining for powering the other compartment is below a second threshold charge level.

In further embodiments, the instructions may cause the one or more processors to transfer at least some of the charge remaining for powering the compartment to the other compartment such that each compartment may have a same amount of charge remaining.

Methods or computer-readable media storing instructions for implementing all or part of the system described above may also be provided in some aspects. Systems for implementing such methods may include one or more of the following: a special-purpose assessment computing device, a mobile computing device (mobile device), a personal electronic device, an on-board computer, a remote server, one or more sensors, one or more communication modules (and/or transceivers) configured to communicate wirelessly via radio links, radio frequency links, and/or wireless communication channels, and/or one or more program memories coupled to one or more processors of the mobile computing device, personal electronic device, on-board computer, or remote server. Such program memories may store instructions to cause the one or more processors to implement part or all of the methods. Additional or alternative features described herein below may be included in some aspects.

In another aspect, a computer-implemented method in a compartmentalized electric vehicle (EV) for delivering loads to a plurality of final destinations may be provided. The method may be implemented via one or more local or remote processors, servers, sensors, transceivers, memory units, and/or other electric or electronic components. In one instance, the method may include: (1) causing a compartmentalized EV, by one or more processors in the compartmentalized EV having a plurality of detachable compartments, each detachable compartment including a power supply, a motor, a set of wheels, and one or more autonomous operation features, to travel to an intermediate destination within a threshold range of a plurality of final destinations; and/or (2) in response to arriving at the intermediate destination, causing at least one of the plurality of detachable compartments, by one or more processors in the detachable compartment, to detach from the compartmentalized EV and to deliver a first load in the detachable compartment to a first final destination of the plurality of final destinations. The method may include additional, less, or alternate actions and functionality, including that discussed elsewhere herein.

For instance, at least some of the charge remaining for powering the first detachable compartment may transferred to the second detachable compartment in response to determining at least one of: (i) the amount of charge remaining for powering the first detachable compartment is above a first threshold charge level; and/or (ii) the amount of charge remaining for powering the second detachable compartment is below a second threshold charge level. At least some of the charge remaining for powering the first detachable compartment may also be transferred to the second detachable compartment such that each compartment has a same amount of charge remaining.

Each of the plurality of detachable compartments may further include a magnet attached to an external surface of the compartment. The plurality of detachable compartments may be attached to each other via magnetic attraction from the magnets. Each compartment may be configured to detach from the compartmentalized EV by de-energizing the magnet attached to the external surface of the compartment.

In some embodiments, the method may further include causing the compartmentalized EV to deliver a second load to a second final destination of the plurality of final destinations.

Also in some embodiments, causing the compartmentalized EV to travel to the intermediate destination may include: (i) obtaining an indication of a route for traveling from a starting location to the intermediate destination; and/or (ii) sending control signals to the compartmentalized EV to cause the compartmentalized EV to travel along the route to the intermediate destination.

In further embodiments, causing the detachable compartment to detach from the compartmentalized EV and to deliver the first load may include: (i) obtaining an indication of a route for traveling from the intermediate destination to the first final destination; (ii) detaching from the compartmentalized EV in response to arriving at the intermediate destination; and/or (iii) sending control signals to the detachable compartment to cause the detachable compartment to travel along the route to the first final destination.

In some embodiments, the method may further include in a first detachable compartment: (i) determining an amount of charge remaining for powering the first detachable compartment; (ii) obtaining indications of amounts of charge remaining for powering other detachable compartments in the compartmentalized EV; and/or (iii) transferring at least some of the charge remaining for powering the first detachable compartment to a second detachable compartment based upon (a) the amount of charge remaining for powering the second detachable compartment, or (b) the amount of charge remaining for powering the first detachable compartment.

In yet another aspect, a computer-implemented method for handing off a load when an electric vehicle (EV) delivering the load is running out of power may be provided. The method may be implemented via one or more local or remote processors, servers, sensors, transceivers, memory units, and/or other electric or electronic components. In one instance, the method may include: (1) receiving, by one or more processors (and/or associated transceivers) in a first EV having one or more autonomous operation features, an indication from a second EV that the second EV has less than a threshold amount of charge remaining, and an indication of a destination for delivering a load in the second EV; (2) determining, by the one or more processors, a meeting location for handing off the load in the second EV; (3) causing, by the one or more processors, the first EV to travel to the meeting location; and/or (4) in response to obtaining the load from the second EV, causing, by the one or more processors, the first EV to travel to the destination for delivering the load. The method may include additional, less, or alternate actions and functionality, including that discussed elsewhere herein.

For instance, the indication that the second EV has less than the threshold amount of charge remaining may be received via a vehicle-to-vehicle (V2V) communication. The meeting location may be a current location of the second EV or a location along a route to the destination.

In some embodiments, the method may further include: transmitting, by the one or more processors (and/or associated transceivers), a response message to the second EV indicating that the first EV will pick up the load from the meeting location and deliver the load to the destination. The response message may be transmitted in response to determining that the first EV is within a threshold distance of the meeting location.

In further embodiments, determining the meeting location may include: (i) receiving, by the one or more processors (and/or associated transceivers), an indication of a route for the second EV to travel to the destination; (ii) determining, by the one or more processors, a waypoint along the route which is closest to a location of the first EV; and/or (iii) transmitting, by the one or more processors (and/or associated transceivers), a request for the determined waypoint to be the meeting location. In some embodiments, the method may further include receiving, by the one or more processors (and/or associated transceivers) from the second EV, an indication accepting the request for the determined waypoint to be the meeting location in response to the second EV determining that the second EV will reach the determined waypoint without running out of power.

Also in some embodiments, causing the first EV to travel to the meeting location may include: (i) obtaining, by the one or more processors, an indication of a route from a current location of the first EV to the meeting location; and/or (ii) sending, by the one or more processors, control signals to cause the first EV to travel along the route to the meeting location.

In some embodiments, causing the first EV to travel to the destination may include: (i) obtaining, by the one or more processors, an indication of a route from the meeting location to the destination; and/or (ii) sending, by the one or more processors, control signals to cause the first EV to travel along the route to the destination.

In further embodiments, the method may further include sending, by the one or more processors, control signals to cause a door to the first EV or trunk of the first EV to open for receiving the load.

Systems or computer-readable media storing instructions for implementing all or part of the system described above may also be provided in some aspects. Systems for implementing such methods may include one or more of the following: a special-purpose assessment computing device, a mobile computing device, a personal electronic device, an on-board computer, a remote server, one or more sensors, one or more communication modules configured to communicate wirelessly via radio links, radio frequency links, and/or wireless communication channels, and/or one or more program memories coupled to one or more processors of the mobile computing device, personal electronic device, on-board computer, or remote server. Such program memories may store instructions to cause the one or more processors to implement part or all of the method described above. Additional or alternative features described herein below may be included in some aspects.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

Figure 1A:
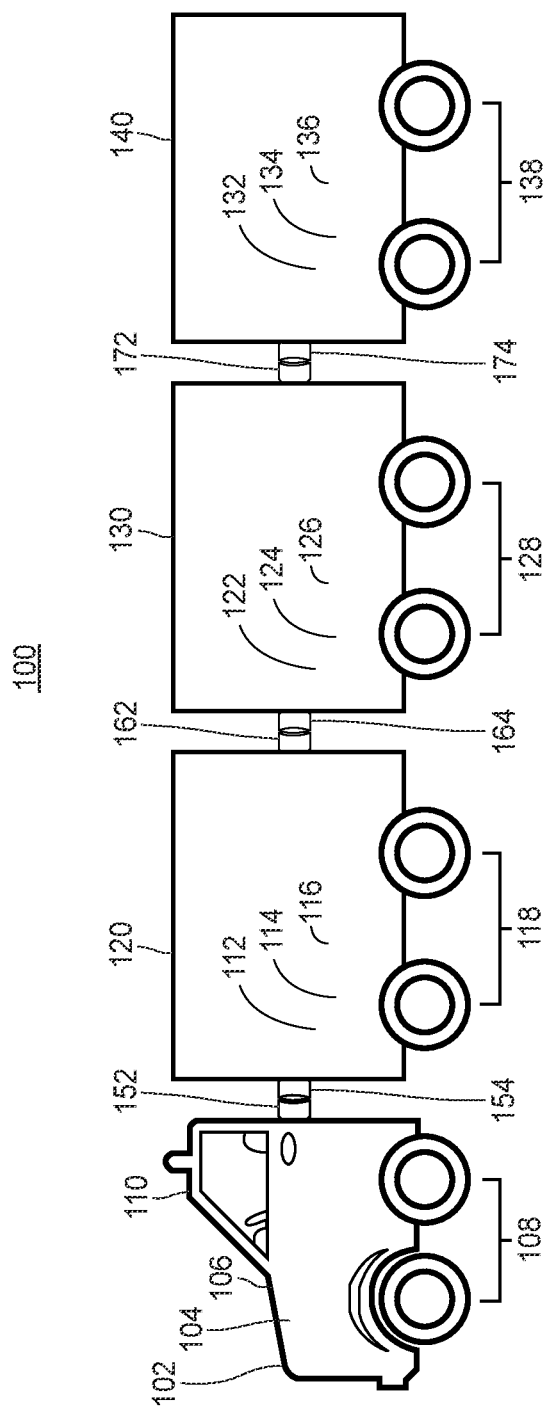
FIG. 1A illustrates an exemplary compartmentalized EV having detachable compartments.

While the systems and methods disclosed herein is susceptible of being embodied in many different forms, it is shown in the drawings and will be described herein in detail specific exemplary embodiments thereof, with the understanding that the present disclosure is to be considered as an exemplification of the principles of the systems and methods disclosed herein and is not intended to limit the systems and methods disclosed herein to the specific embodiments illustrated. In this respect, before explaining at least one embodiment consistent with the present systems and methods disclosed herein in detail, it is to be understood that the systems and methods disclosed herein is not limited in its application to the details of construction and to the arrangements of components set forth above and below, illustrated in the drawings, or as described in the examples. Methods and apparatuses consistent with the systems and methods disclosed herein are capable of other embodiments and of being practiced and carried out in various ways. Also, it is to be understood that the phraseology and terminology employed herein, as well as the abstract included below, are for the purposes of description and should not be regarded as limiting.

DETAILED DESCRIPTION

The systems and methods disclosed herein generally relate to, inter alia, various aspects of electric vehicles (e.g., cars, trucks, motorcycles, etc.) and utilizing fuel and/or battery power within an electric vehicle to power components within the electric vehicle, such as the motor, engine (or other means of movement or propulsion), steering control, brakes, vehicle sensors, lighting, heating system, cooling system, in-vehicle infotainment system, windshield wipers, etc. The electric vehicles described herein may include fully electric vehicles powered solely by a battery or hybrid vehicles powered by a combination of a battery and fuel, such as gasoline.

The systems and methods disclosed herein also generally relate to various aspects of communication between autonomous operation features, components, and software. The autonomous operation features may take full control of the vehicle under certain conditions, viz. fully autonomous operation, or the autonomous operation features may assist the vehicle operator in operating the vehicle, viz. partially autonomous operation. Fully autonomous operation features may include systems within the vehicle that pilot the vehicle to a destination with or without a vehicle operator present (e.g., an operating system for a driverless car). Partially autonomous operation features may assist the vehicle operator in limited ways (e.g., automatic braking or collision avoidance systems). Fully or partially autonomous operation features may perform specific functions to control or assist in controlling some aspect of vehicle operation, or such features may manage or control other autonomous operation features. For example, a vehicle operating system may control numerous subsystems that each fully or partially control aspects of vehicle operation. The electric vehicles described herein may be fully autonomous, partially autonomous, manually operated, or any suitable combination of these.

Autonomous operation features utilize data not available to a human operator, respond to conditions in the vehicle operating environment faster than human operators, and do not suffer fatigue or distraction. Thus, the autonomous operation features may also significantly affect various risks associated with operating a vehicle.

In certain embodiments, the electric vehicles may be boats, planes, or unmanned aerial vehicles (such as drones), and the systems and methods may relate to utilizing fuel and/or battery power within the electric vehicle to power components within the electric vehicle, such as the motor, engine (or other means of movement or propulsion), rotors, propellers, wings, or other means of movement or propulsion, such as ground, water, and/or air travel.

Exemplary Compartmentalized Electric Vehicle

FIG. 1A illustrates an exemplary compartmentalized EV 100 having detachable compartments 110-140 where each detachable compartment 110-140 may be configured to operate separately from the other detachable compartments 110-140. Each detachable compartment 110-140 may include a power supply 102-142, such as a battery which supplies power to the electrical components within the detachable compartment 110-140, such as a motor 104-134, on-board computer 106-136, engine, steering control, brakes, vehicle sensors, lighting, heating system, cooling system, windshield wipers, etc.

Each battery 102-132 may be electrically coupled to the components within the detachable compartment 110-140, for example via a wired connection. Each battery 102-132 may include a charge level sensor to detect the amount of charge remaining in the battery 102-132. Each detachable compartment 110-140 may also include a separate set of wheels 108-138 and/or autonomous operation features for the respective on-board computer 106-146 to autonomously operate the detachable compartment 110-140. Accordingly, each detachable compartment 110-140 may be configured to operate as a stand-alone EV, such that each detachable compartment 110-140 can travel to different final destinations to drop respective loads off at the final destinations.

Each of the detachable compartments 110-140 within the compartmentalized EV 100 may be attached to each other, such that they may all travel to the same location. In this manner, the compartments 110-140 may conserve energy and transfer power between each other to prevent any one compartment from draining its battery while they are attached. The compartments 110-140 may share power amongst the respective batteries 102-132 when for example, one compartment 110 is performing most of the control (e.g., the steering, braking, throttling, etc.) and the others 120-140 are being carried along by being attached to the compartment 110.

The detachable compartments 110-140 may also detach from the compartmentalized EV 100 so that a particular detachable compartment 110-140 may travel to a separate location from the compartmentalized EV 100. For example, the compartmentalized EV 100 may travel to an intermediate destination which may be a centralized location proximate to several final destinations for the detachable compartments 110-140 to separately deliver their respective loads. Upon arriving at the intermediate destination, the detachable compartments 110-140 may detach from the compartmentalized EV 100 and travel to their respective final destinations.

More specifically, each detachable compartment 110-140 may include one or more attachment mechanisms, such as magnets 152-174 attached to external surface(s) of the detachable compartment 110-140. In some implementations, a detachable compartment 120 may include a first magnet 154 attached to the front of the detachable compartment 120 and a second magnet 162 attached to the back of the detachable compartment 120. The first and second magnets 154, 162 may have the opposite polarity so that a magnet 162 attached to the back of one detachable compartment 120 is attracted to a magnet 164 attached to the front of another detachable compartment 130, thereby causing the two compartments 120, 130 to attach via magnetic attraction.

In other implementations, each detachable compartment 110-140 may be layered with a magnetic coating or may include magnetic materials to attach to the other detachable compartments 110-140. The magnets 152-174 may be permanent magnets or electromagnets. In embodiments where the magnets 152-174 are electromagnets, the on-board computer 106 within a detachable compartment 110 may send a control signal to energize the magnet 152 for the detachable compartment 110. To detach from the other compartments 120-140, the on-board computer 106 may stop sending an electric signal to the magnet 152 to de-energize the magnet 152. Then the magnet 152 may no longer attach to the magnet 154 for the compartment 120.

In other implementations, such as when the magnets 152-174 are permanent magnets, a compartment 110-140 may accelerate by more than a threshold acceleration in a direction opposite the direction of attachment to the compartmentalized EV 100 to detach from the compartmentalized EV 100. The threshold acceleration may correspond to a force which is greater than the force of magnetic attraction of the magnets to separate the compartment 110-140 from the other compartments 110-140. For example, the compartment 140 may be attached in the front to the compartment 130. To detach from the compartment 130, the compartment 140 may accelerate backwards away from the front-facing attachment by more than the threshold acceleration.

To monitor the compartmentalized EV 100, each detachable compartment 110-140 may include one or more sensors installed within the compartment 110-140 and/or personal electronic devices that may communicate with the respective on-board computer 106-136 in the compartment 110-140. The sensor data may be processed using the on-board computer 106-136 or a mobile device (e.g., a smart phone, a tablet computer, a special purpose computing device, smart watch, wearable electronics, smart glasses, augmented reality (AR) glasses, virtual reality (VR) headset, etc.) to determine when the detachable compartment 110-140 is in operation and information regarding the detachable compartment 110-140.

One or more on-board computers 106-136 may be permanently or removably installed in each detachable compartment 110-140. Each on-board computer 106-136 may interface with the one or more sensors within the detachable compartment 110-140 (e.g., a digital camera, a LIDAR sensor, an ultrasonic sensor, an infrared sensor, an ignition sensor, an odometer, a system clock, a speedometer, a tachometer, an accelerometer, a gyroscope, a compass, a geolocation unit, radar unit, etc.), which sensors may also be incorporated within or connected to the on-board computer 106-136.

Each detachable compartment 110-140 may further include a communication component to transmit information to and receive information from external sources, including the other compartments 110-140, other vehicles, infrastructure, etc. In some embodiments, a mobile device in each compartment 110-140 may supplement the functions performed by the on-board computer 106-136 described herein by, for example, sending or receiving information to and from other compartments 110-140 or other vehicles via a network, such as over one or more radio frequency links or wireless communication channels. In other embodiments, the on-board computer 106-136 may perform all of the functions of the mobile device described herein, in which case no mobile device may be present in the detachable compartments 110-140. Additionally, the mobile device and on-board computer 106-136 in each compartment 110-140 may communicate with one another directly over a communication link.

Each mobile device may be either a general-use personal computer, cellular phone, smart phone, tablet computer, smart watch, wearable electronics, or a dedicated vehicle monitoring or control device. Each on-board computer 106-136 may be a general-use on-board computer capable of performing many functions relating to vehicle operation or a dedicated computer for autonomous vehicle operation. Further, each on-board computer 106-136 may be installed by the manufacturer of the compartmentalized EV 100 or as an aftermarket modification or addition to the compartmentalized EV 100. In some embodiments or under certain conditions, each mobile device or on-board computer 106-136 may function as thin-client devices that outsource some or most of the processing to a server.

The sensors 120 may be removably or fixedly installed within each detachable compartment 110-140 and may be disposed in various arrangements to provide information to the detachable compartment 110-140 for operation. Among the sensors may be included one or more of a GPS unit, a radar unit, a LIDAR unit, an ultrasonic sensor, an infrared sensor, an inductance sensor, a camera, an accelerometer, a tachometer, a speedometer, an outdoor temperature sensor for sensing the temperature outside of the detachable compartment 110-140, and/or an in-cabin temperature sensor for sensing the temperature within the detachable compartment 110-140.

Some of the sensors (e.g., radar, LIDAR, or camera units) may actively or passively scan the vehicle environment for obstacles (e.g., other vehicles, buildings, pedestrians, etc.), roadways, lane markings, signs, or signals. Other sensors (e.g., GPS, accelerometer, or tachometer units) may provide data for determining the location or movement of the detachable compartment 110-140. Still other sensors may be directed to the interior of the detachable compartment 110-140, such as cameras, microphones, pressure sensors, thermometers, or similar sensors to monitor the vehicle operator and/or passengers within the detachable compartment 110-140. Information generated or received by the sensors may be communicated to the on-board computer 106-136 or the mobile device within the respective detachable compartment 110-140 for use in vehicle operation.

In addition to receiving information from the sensors, the on-board computer 106-136 in a particular detachable compartment 110-140 may directly or indirectly control the operation of the detachable compartment 110-140 according to various autonomous operation features. The autonomous operation features may include software applications or modules implemented by the on-board computer 106-136 to generate and implement control commands to control the steering, braking, or throttle of the detachable compartment 110-140. To facilitate such control, the on-board computer 106-136 may be communicatively connected to control components of the detachable compartment 110-140 by various electrical or electromechanical control components (not shown). When a control command is generated by the on-board computer 106-136, it may thus be communicated to the control components of the detachable compartment 110-140 to effect a control action. In embodiments involving fully autonomous vehicles, the detachable compartment 110-140 may be operable only through such control components (not shown). In other embodiments, the control components may be disposed within or supplement other vehicle operator control components (not shown), such as steering wheels, accelerator or brake pedals, or ignition switches.

Figure 1B:
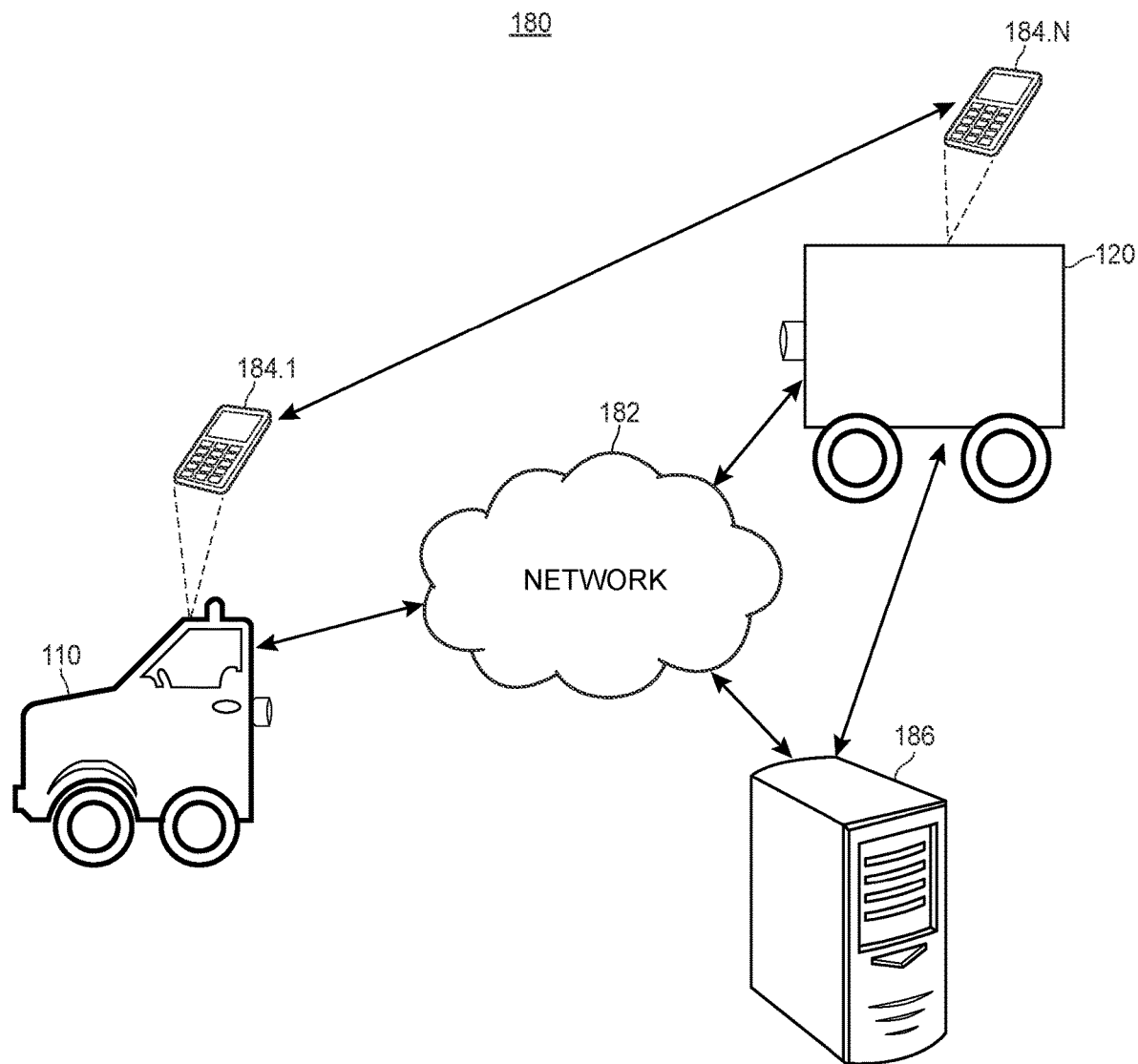
FIG. 1B illustrates a block diagram of an exemplary EV communication system, showing EV compartments and a remote server device.

FIG. 1B illustrates a block diagram of an exemplary EV communication system 180 on which the exemplary methods described herein may be implemented. In one aspect, system 180 may include a network 182, N number of vehicles and/or vehicle compartments 110-120 and respective mobile computing devices 184.1-184.N, one or several personal electronic devices (not shown), and/or a remote server device 186. The vehicle compartments 110-120 may include compartments within a compartmentalized EV 100 or within multiple EVs. Some of the vehicle compartments 110-120 may have autonomous operation features while others may not have autonomous operation features.

Each of vehicles and/or vehicle compartments 110-120 may be configured for wireless inter-vehicle communication, such as vehicle-to-vehicle (V2V) wireless communication and/or data transmission via the communication component, directly via the mobile computing devices 184.1-184.N, or otherwise.

Although system 180 is shown in FIG. 1B as including one network 180, two mobile computing devices 184.1 and 184.N, two vehicle compartments 110 and 120, and/or one remote server device 186, various embodiments of system 180 may include any suitable number of networks 180, mobile computing devices 184.1-184.N, vehicles and/or vehicle compartments 110-120, and/or remote server devices 186.

In one aspect, each of mobile computing devices 184.1 and 184.N may be configured to communicate with one another directly via peer-to-peer (P2P) wireless communication and/or data transfer. In other aspects, each of mobile computing devices 184.1 and 184.N may be configured to communicate indirectly with one another and/or any suitable device via communications over network 180, such as remote computing device, for example. In still other aspects, each of mobile computing devices 184.1 and 184.N may be configured to communicate directly and/or indirectly with other suitable devices, which may include synchronous or asynchronous communication.

Each of mobile computing devices 184.1 and 184.N and/or personal electronic devices may be configured to send data to and/or receive data from one another and/or via network 180 using one or more suitable communication protocols, which may be the same communication protocols or different communication protocols. For example, mobile computing devices 184.1 and 184.N may be configured to communicate with one another via a direct radio link, which may utilize, for example, a Wi-Fi direct protocol, an ad-hoc cellular communication protocol, etc.

Mobile computing devices 184.1 and 184.N and/or personal electronic devices may also be configured to communicate with vehicles and/or vehicle compartments 110-120, respectively, utilizing a BLUETOOTH communication protocol (radio link not shown). In some embodiments, this may include communication between a mobile computing device 184.1 and a vehicle controller. In other embodiments, it may involve communication between a mobile computing device 184.N and a vehicle telephony, entertainment, navigation, or information system (not shown) of the vehicle and/or vehicle compartment 120 that provides functionality other than autonomous (or semi-autonomous) vehicle control. Thus, vehicles and/or vehicle compartments without autonomous operation features may nonetheless be connected to mobile computing devices in order to facilitate communication, information presentation, or similar non-control operations (e.g., navigation display, hands-free telephony, or music selection and presentation).

To provide additional examples, mobile computing devices 184.1 and 184.N and/or personal electronic devices may be configured to communicate with one another via radio links by each communicating with network 180 utilizing a cellular communication protocol. As an additional example, mobile computing devices 184.1 and/or 184.N may be configured to communicate with the remote server device 186 via radio links. Similarly, one or more vehicle controllers may be configured to communicate directly to the network 180 or indirectly through mobile computing device 184.1. Vehicle controllers may also communicate with other vehicle controllers and/or mobile computing devices 184.N directly or indirectly through mobile computing device 184.1 via local radio links.

As discussed elsewhere herein, network 180 may be implemented as a wireless telephony network (e.g., GSM, CDMA, LTE, etc.), a Wi-Fi network (e.g., via one or more IEEE 802.11 Standards), a WiMAX network, a Bluetooth network, etc.

The remote server device 186 may facilitate communication between the vehicles and/or vehicle compartments 110-120. For example, a vehicle compartment 110 may transmit a request to the remote server device 186 for the amount of charge remaining in the batteries 112-132 of the other compartments within a compartmentalized EV 100. The remote server device 186 may receive responses to the requests and forward the responses to the vehicle compartment 110. In other implementations, the vehicle compartments 110-120 communicate directly with each other.

In some embodiments, the remote server device 186 may generate a route from a starting location for a compartmentalized EV 100 to an intermediate destination at a centralized location proximate to several final destinations for delivering loads in the respective compartments of the EV 100. The remote server device 186 may also determine the intermediate destination by identifying a location within a threshold radius of each of the final destinations. Additionally, the remote server device 186 may generate routes from the intermediate destination to each of the final destinations. Then the remote server device 186 may provide the generated routes to the intermediate destination and/or the final destinations to the compartmentalized EV 100 and/or the particular compartments 110-140 delivering loads to the final destinations.

Also in some embodiments, the remote server device 186 may obtain location information for EVs and may determine a meeting location for the EVs, for example during a delivery hand off, described in more detail below.

Additionally, the mobile computing devices 184.1 and 184.N may be configured to execute one or more algorithms, programs, applications, etc., to (i) determine a geographic location of each respective mobile computing device (and thus their associated vehicle); (ii) to generate, measure, monitor, and/or collect one or more sensor metrics as telematics data; (iii) to broadcast the geographic data and/or telematics data via their respective radio links; (iv) to receive the geographic data and/or telematics data via their respective radio links; (v) to determine whether an alert should be generated based upon the telematics data and/or the geographic location data, to generate the one or more alerts; and/or (vi) to broadcast one or more alert notifications. Such functionality may, in some embodiments be controlled in whole or part by a Data Application operating on the mobile computing devices 184. Such Data Application may communicate between the mobile computing devices 184 and one or more remote server devices 186 to facilitate centralized data collection and/or processing.

In some embodiments, the Data Application may facilitate control of a vehicle and/or vehicle compartment 110-120 by a user, such as by selecting vehicle destinations and/or routes along which the vehicle and/or vehicle compartment 110-120 will travel. The Data Application may further be used to establish restrictions on vehicle use or store user preferences for vehicle use, such as in a user profile. In further embodiments, the Data Application may monitor vehicle operation or sensor data in real-time to make recommendations or for other purposes as described herein. The Data Application may further facilitate monitoring and/or assessment of the vehicle and/or vehicle compartment 110-120, such as by evaluating operating data to determine the condition of the vehicle or components thereof (e.g., sensors, autonomous operation features, etc.).

Figure 2:
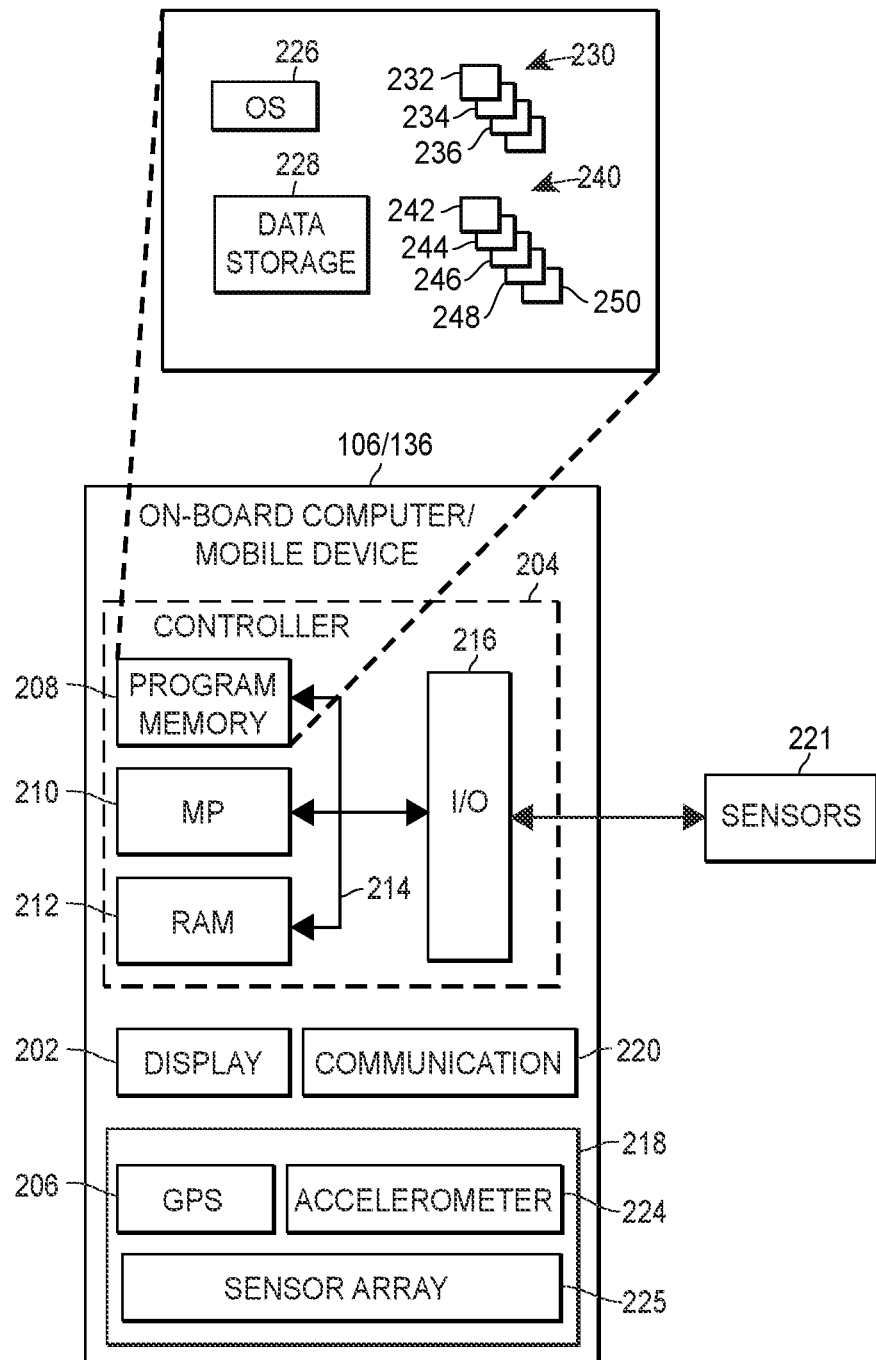
FIG. 2 illustrates a block diagram of an exemplary on-board computer or mobile device.

FIG. 2 illustrates a block diagram of an exemplary mobile device 184 or an exemplary on-board computer 106-136 consistent with the compartmentalized EV 100 and the system 180. The mobile device 184 or on-board computer 106-136 may include a display 202, a GPS unit 206, a communication unit 220, an accelerometer 224, one or more additional sensors (not shown), a user-input device (not shown), and/or, a controller 204. In some embodiments, the mobile device 184 or on-board computer 106-136 may be integrated into a single device, or either the mobile device 184 or on-board computer 106-136 may perform the functions of both. The on-board computer 106-136 (or mobile device 184) interfaces with the sensors 221 and/or personal electronic devices to receive information regarding the respective compartment 110-140 and its environment, which information is used by the autonomous operation features to operate the respective compartment 110-140.

The controller 204 may include a program memory 208, one or more microcontrollers or microprocessors (MP) 210, a RAM 212, and an I/O circuit 216, all of which are interconnected via an address/data bus 214. The program memory 208 includes an operating system 226, a data storage 228, a plurality of software applications 230, and/or a plurality of software routines 240. The operating system 226, for example, may include one of a plurality of general purpose or mobile platforms, such as the Android™, iOS®, or Windows® systems, developed by Google Inc., Apple Inc., and Microsoft Corporation, respectively. Alternatively, the operating system 226 may be a custom operating system designed for autonomous vehicle operation using the on-board computer 106-136.

The data storage 228 may include data such as user profiles and preferences, application data for the plurality of applications 230, routine data for the plurality of routines 240, and other data related to the autonomous operation features. In some embodiments, the controller 204 may also include, or otherwise be communicatively connected to, other data storage mechanisms (e.g., one or more hard disk drives, optical storage drives, solid state storage devices, etc.) that reside within the vehicle compartment 110-140.

It should be appreciated that although FIG. 2 depicts only one microprocessor 210, the controller 204 may include multiple microprocessors 210. Similarly, the memory of the controller 204 may include multiple RAMs 212 and multiple program memories 208. Although FIG. 2 depicts the I/O circuit 216 as a single block, the I/O circuit 216 may include a number of different types of I/O circuits. The controller 204 may implement the RAMs 212 and the program memories 208 as semiconductor memories, magnetically readable memories, or optically readable memories, for example.

The one or more processors 210 may be adapted and configured to execute any of one or more of the plurality of software applications 230 or any one or more of the plurality of software routines 240 residing in the program memory 204, in addition to other software applications. One of the plurality of applications 230 may be an autonomous vehicle operation application 232 that may be implemented as a series of machine-readable instructions for performing the various tasks associated with implementing one or more of the autonomous operation features. Another of the plurality of applications 230 may be a power transferring application 234 that may be implemented as a series of machine-readable instructions for transferring power from the battery 102 to charge another battery 112-132 in another compartment 120-140. Still another application of the plurality of applications 230 may include a delivery hand off application 236 that may be implemented as a series of machine-readable instructions for receiving a load from another EV and delivering the load to a destination.

The plurality of software applications 230 may call various of the plurality of software routines 240 to perform functions relating to autonomous vehicle operation, monitoring, or communication. One of the plurality of software routines 240 may be a routing routine 242 to route the compartmentalized EV 100 to an intermediate destination. Another of the plurality of software routines 240 may be a detachment routine 244 to detach a particular compartment 140 from the compartmentalized EV 100. Still another of the plurality of software routines 240 may be an autonomous control routine 246 that performs a type of autonomous control, such as collision avoidance, lane centering, or speed control. In some embodiments, the autonomous vehicle operation application 232 may cause a plurality of autonomous control routines 246 to determine control actions required for autonomous vehicle operation.

Similarly, one of the plurality of software routines 240 may be a monitoring and reporting routine 248 that transmits information regarding autonomous vehicle operation to the server 186 via the network 130. Yet another of the plurality of software routines 240 may be a route separate routine 250 for routing the compartments 110-140 to different final destinations. Any of the plurality of software applications 230 may be designed to operate independently of the software applications 230 or in conjunction with the software applications 230.

In addition to connections to the sensors 221 that are external to the mobile device 184 or the on-board computer 106-136, the mobile device 184 or the on-board computer 106-136 may include additional sensors 218, such as the GPS unit 206 or the accelerometer 224, which may provide information regarding the particular compartment 110-140 for operation and other purposes. Such sensors 218 may further include one or more sensors of a sensor array 225, which may include, for example, one or more cameras, accelerometers, gyroscopes, magnetometers, barometers, thermometers, proximity sensors, light sensors, Hall Effect sensors, etc. The one or more sensors of the sensor array 225 may be positioned to determine telematics data regarding the speed, force, heading, and/or direction associated with movements of the particular compartment 110-140.

Furthermore, the communication unit 220 may communicate with other compartments, autonomous vehicles, infrastructure, or other external sources of information to transmit and receive information relating to vehicle operation. The communication unit 220 may communicate with the external sources via the network 180 or via any suitable wireless communication protocol network, such as wireless telephony (e.g., GSM, CDMA, LTE, etc.), Wi-Fi (802.11 standards), WiMAX, Bluetooth, infrared or radio frequency communication, etc. The communication unit 220 may provide input signals to the controller 204 via the I/O circuit 216. The communication unit 220 may also transmit sensor data, device status information, control signals, or other output from the controller 204 to one or more external sensors within the compartments 110-140, mobile devices 186, on-board computers 106-136, or servers 186.

The mobile device 184 or the on-board computer 106-136 may include a user-input device (not shown) for receiving instructions or information from the vehicle operator, such as settings relating to an autonomous operation feature. The user-input device (not shown) may include a "soft" keyboard that is displayed on the display 202, an external hardware keyboard communicating via a wired or a wireless connection (e.g., a Bluetooth keyboard), an external mouse, a touch pad, a microphone, or any other suitable user-input device. The user-input device (not shown) may also include a microphone capable of receiving user voice input.

Exemplary Power Transfer

Figure 3:
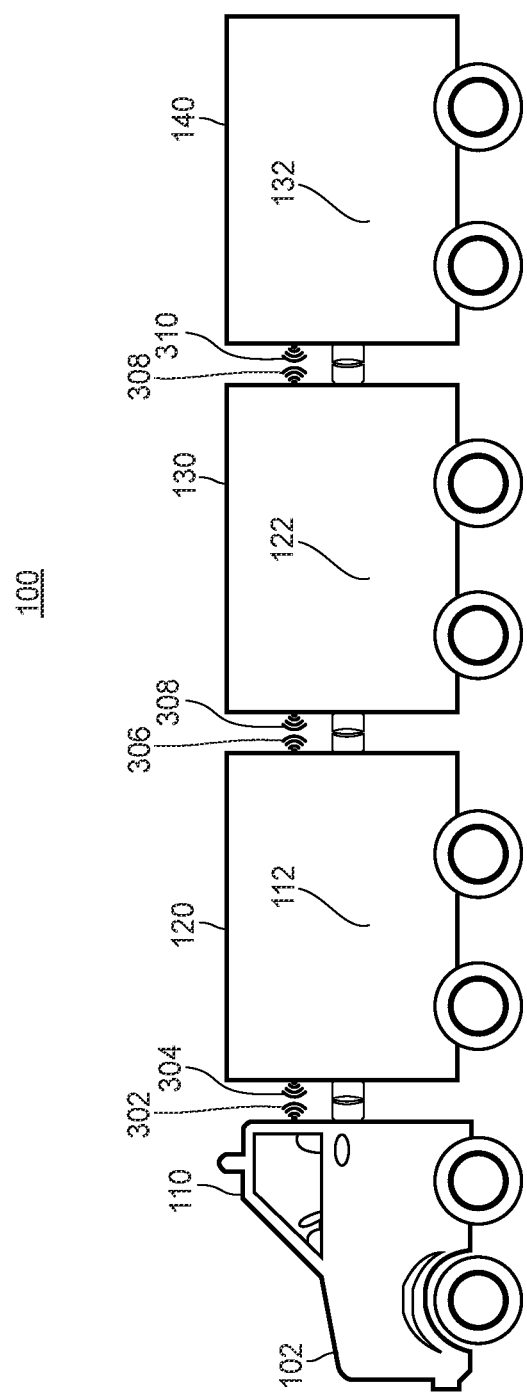
FIG. 3 illustrates an exemplary transfer of power between the detachable compartments.

FIG. 3 illustrates an example transfer of power between the detachable compartments 110-140 within the compartmentalized EV 100. As mentioned above, the compartments 110-140 may share power amongst the respective batteries 102-132 when for example, one compartment 110 is performing most of the control (e.g., the steering, braking, throttling, etc.) and the others 120-140 are being carried along by being attached to the compartment 110. Accordingly, the compartments 110-140 may prevent any one compartment from draining its battery while they are attached.

To transfer power amongst each other, the compartments 110-140 may transmit requests for the amount of charge remaining in the batteries 102-132 in each respective compartment 110-140. For example, the on-board computers 106-136 in the compartments 110-140 may transmit V2V communications to each other requesting charge statuses from the other compartments 110-140 and receiving responses to the requests.

In some implementations, one compartment 110 may act as a primary compartment 110 and may receive the charge statuses from each of the other compartments. Then the primary compartment 110 may identify compartments in which to transfer power based upon the amount of charge remaining in another compartment 120-140 and/or the amount of charge remaining in the primary compartment 110. For example, the primary compartment 110 may identify compartments 110-140 having more than a first threshold charge level (e.g., 50% battery power remaining) and compartments 110-140 having less than a second threshold charge level (e.g., 20% battery power remaining). The primary compartment 110 may transmit instructions to the compartments 110-140 having more than the first threshold charge level to transfer power to the compartments 110-140 having less than the second threshold charge level.

In other implementations, the primary compartment 110 may aggregate the total amount of charge remaining across the compartments 110-140 and divide the total amount of charge by the number of compartments 110-140 to determine the average amount of charge remaining. Then the primary compartment 110 may transmit instructions to the compartments 110-140 to transfer power between the compartments 110-140 until each of the compartments 110-140 has the average amount of charge remaining, so that each of the compartments 110-140 has the same amount of charge remaining.

In yet other implementations, one compartment does not act as a primary compartment. Instead, each compartment 110-140 receives charge statuses from adjacent compartments directly connected to the compartment. For example, compartment 120 receives charge statuses from compartment 110 and compartment 130. Then a particular compartment 120 may determine whether any of the adjacent compartments has less power remaining than the second threshold charge level. If the compartment 120 has more power remaining than the first threshold charge level and an adjacent compartment 130 has less power remaining than the second threshold charge level, the compartment 120 transfers power to the adjacent compartment 130 for example, until the adjacent compartment has more power remaining than the second threshold charge level. In another example, the compartment 120 transfers power to the adjacent compartment 130 until both compartments have the same amount of charge remaining. In some implementations, multiple compartments 120, 140 may transfer power to the same compartment 130 reducing the amount of power that each compartment 120, 140 transfers.

In any event, to transfer power from a first compartment 110 to a second compartment 120, the first compartment 110 transmits a communication signal 302 via a radio link (e.g., a near field communication (NFC) link) to the second compartment 120 to inductively charge the second compartment 120. The first compartment 110 includes an antenna having a transmit coil and the second compartment 120 includes an antenna having a receive coil. The transmit and receive coils may induce a magnetic field to transfer power from the first compartment to the second compartment 120. Each compartment 110-140 may transmit communication signals 302-310 via radio links, such as NFC links to inductively charge adjacent compartments. To transfer power to a nonadjacent compartment 140, a compartment 110 may transfer power to an adjacent compartment 120 which continues to transfer the power to adjacent compartments until the nonadjacent compartment 140 receives the power.

Exemplary Compartmentalized EV Routing

In some embodiments, some or all of the compartments 110-140 include a load to deliver to a different destination. The compartments 110-140 may attach to each other when each of the compartments 110-140 is traveling to the same geographic area (e.g., the same city, the same neighborhood, the same suburb, the same town, etc.) but different destinations within the geographic area. This may save power for the compartments 110-140 by spreading the power out across each of the compartments 110-140 in the compartmentalized EV 100. Additionally, each compartment 110-140 may not have to control steering, braking, and/or throttling. Instead, one compartment 110-140 may perform most of the control while pulling the other attached compartments 110-140 along or the other attached compartments may provide minimal power to their respective wheels.

Figure 4:
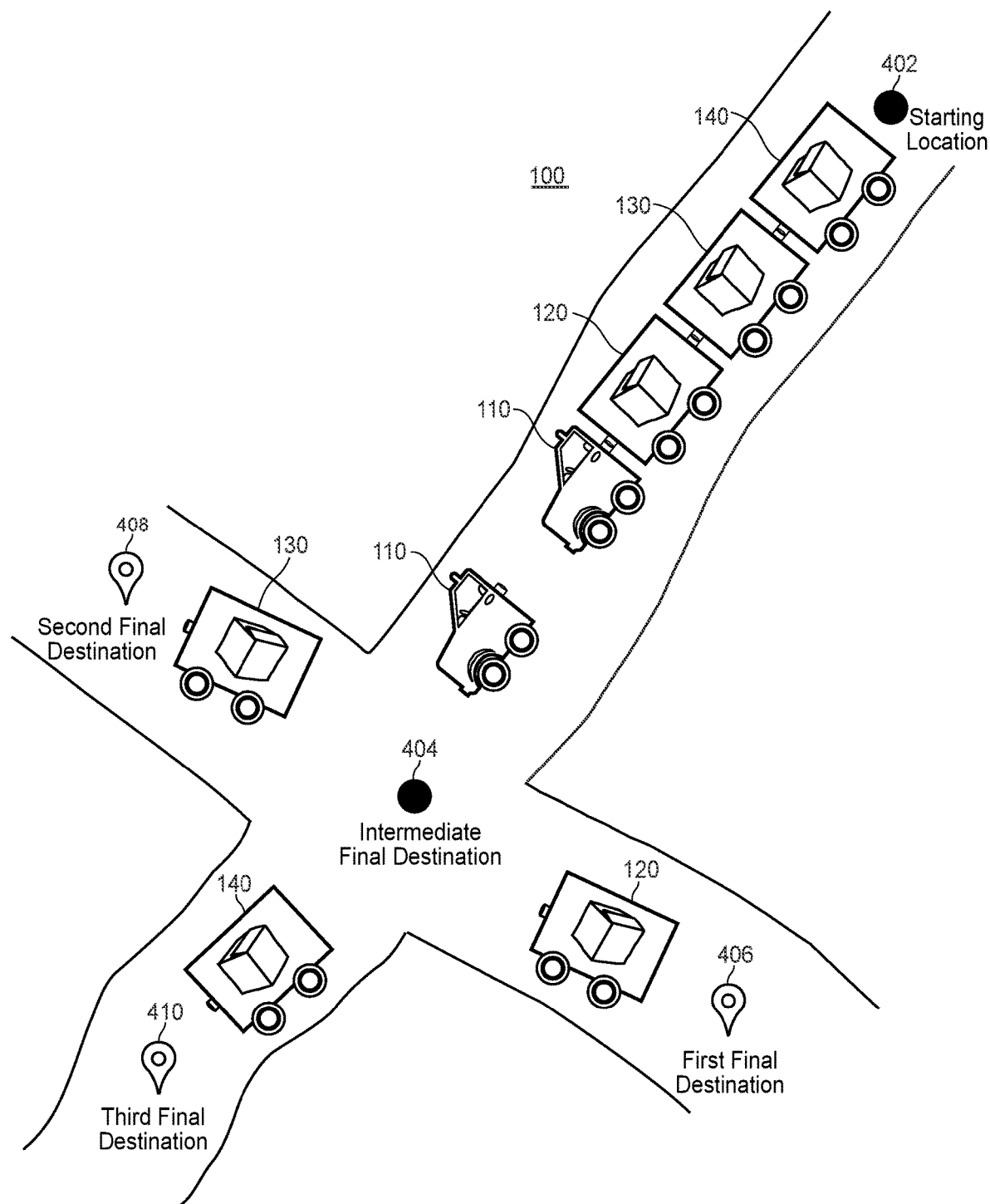
FIG. 4 illustrates a schematic diagram of an exemplary compartmentalized EV on a route to an intermediate destination where each compartment detaches from the EV and travels to a different final destination to deliver a respective load.

FIG. 4 illustrates a schematic diagram of an exemplary compartmentalized EV 100 on a route from a starting location 402 to an intermediate destination 404. The compartmentalized EV 100 includes four compartments 110-140, where three of the four compartments may carry loads to different final destinations 406-410. However, this is merely one example embodiment for ease of illustration only. The compartmentalized EV 100 may include any suitable number of compartments carrying any suitable number of loads to any suitable number of final destinations.

In some implementations, an on-board computer 106-136 in one of the compartments may transmit a request to the remote server device 186 for navigation directions from the starting location 402 to the final destinations 406-410. The on-board computer 106-136 may also transmit a request for the remote server device 186 to identify an intermediate destination 404 which is equidistant to each of the final destinations 406-410 or within a threshold radius of each of the final destinations 406-410. The remote server device 186 may communicate with a map and/or navigation server to identify the intermediate destination 402. The remote server device 186 may also generate a first set of navigation directions for traversing along a first route from the starting location 402 to the intermediate destination 404. Additionally, the remote server device 186 may generate second sets of navigation directions for traveling along respective second routes from the intermediate destination 404 to each of the final destinations 406-410. Then the remote server device 186 may transmit each of the first and second sets of navigation directions to the on-board computer 106-136.

In some implementations, the on-board computer 106-136 may use the first set of navigation directions to cause the compartmentalized EV 100 to travel to the intermediate destination 404. For example, the on-board computer 106-136 may send control signals to the compartmentalized EV 100, and more specifically, the steering, braking, and throttling components within the compartmentalized EV 100 to cause the EV 100 to travel along the first route to the intermediate destination 404.

The on-board computer 106 may also forward the second sets of navigation directions to on-board computers 116-136 in the respective compartments 120-140, so that the on-board computers 116-136 may cause the respective compartments 120-140 to travel along the respective second routes to the respective final destinations 406-410. For example, the on-board computer 106 may forward a set of navigation directions for traveling to a first final destination to a first on-board computer 116. The on-board computer 106 may forward another set of navigation directions for traveling to a second final destination 408 to a second on-board computer 126. The on-board computer 106 may also forward a set of navigation directions for traveling to a third final destination 410 to a third on-board computer 136.

Upon arriving at the intermediate destination 404, the compartments 120-140 may detach from the compartmentalized EV 100 in the manner described above. For example, the compartments 120-140 may de-energize their respective magnets or may accelerate by more than a threshold acceleration in a direction opposite the direction of attachment to the compartmentalized EV 100.

Then a first compartment 120 may travel with a first load to a first final destination 406. For example, the on-board computer 116 may send control signals to the first compartment 120, and more specifically, the steering, braking, and throttling components within the first compartment 120 to cause the first compartment 120 to travel along a route to the first final destination 406.

A second compartment 130 may travel with a second load to a second final destination 408. For example, the on-board computer 126 may send control signals to the second compartment 130, and more specifically, the steering, braking, and throttling components within the second compartment 130 to cause the second compartment 130 to travel along a route to the second final destination 408.

A third compartment 140 may travel with a third load to a third final destination 410. For example, the on-board computer 136 may send control signals to the third compartment 140, and more specifically, the steering, braking, and throttling components within the third compartment 140 to cause the third compartment 140 to travel along a route to the third final destination 410.

Exemplary Delivery Hand Off Procedure

In some scenarios, an EV delivering a load to a destination or recipient location may run low on power. The amount of charge remaining for the EV may be too low for the EV to reach the destination or a charging station without running out of power. In these scenarios, the EV may request emergency services, such as towing services or a temporary charge. The EV may also broadcast a notification to other EVs in the geographic area requesting another EV to pick up the load from the EV and transport the load the rest of the way to the destination. For example, the EV may broadcast the notification when the EV determines that the load will not be delivered on time if the EV waits for emergency services to arrive and temporarily charge the EV.

The EV may be fully autonomous, partially autonomous, manually operated, or any suitable combination of these. Additionally, the other EVs receiving the broadcast notification may be fully autonomous, partially autonomous, manually operated, or any suitable combination of these.

Figure 5A:
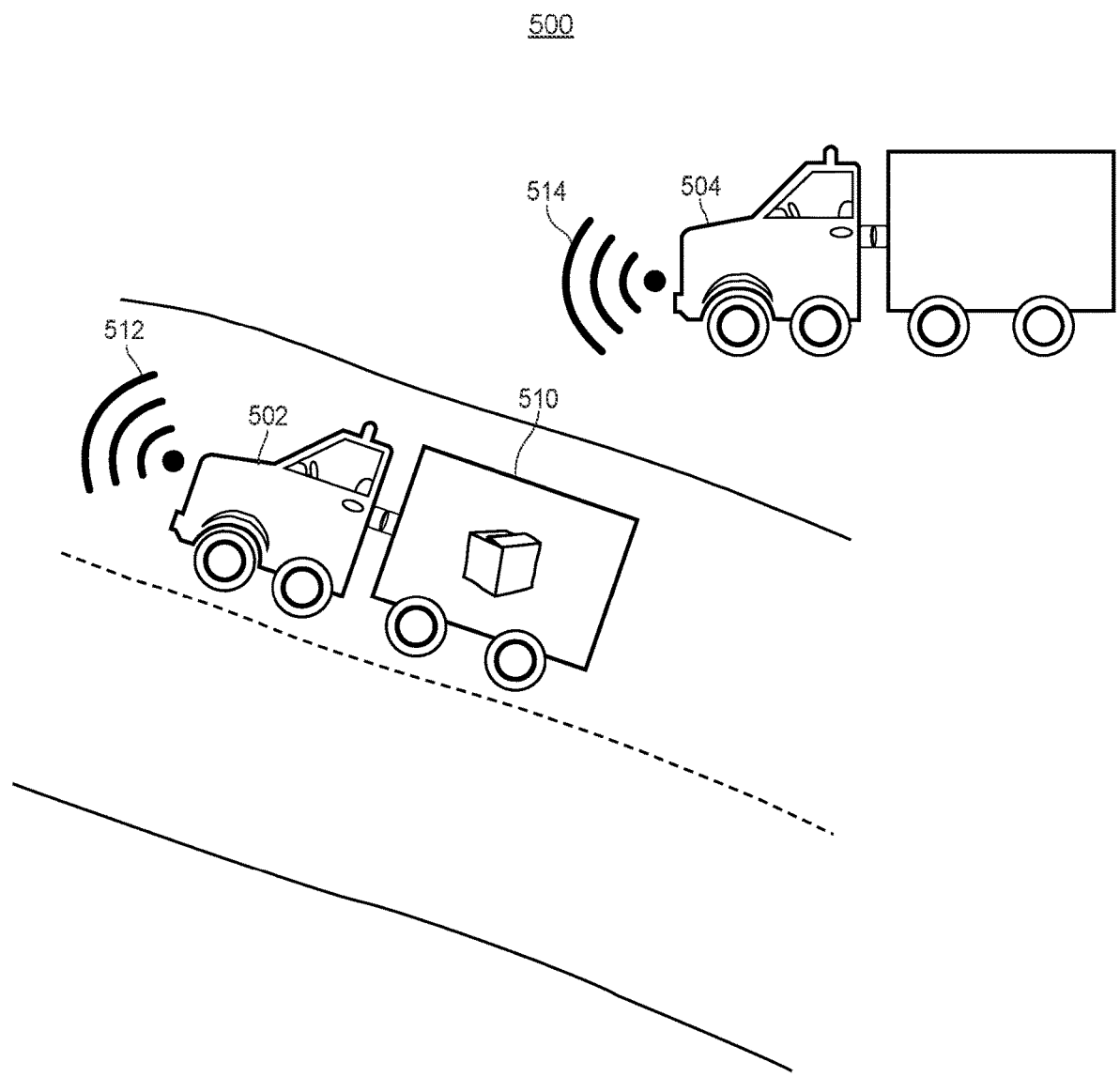
FIGS. 5A-5C illustrate an example delivery hand off procedure where a first EV delivering a load is running out of power, and a second EV picks up the load from the first EV and transports the load to its destination.

FIG. 5A illustrates an example scenario 500 where an EV 502 delivering a load 510 is running out of power (also referred to herein as a "low charge EV"). For example, the amount of charge remaining in the low charge EV 502 may be below a threshold amount of charge to reach the destination and/or a charging station. The low charge EV 502 may be a compartmentalized EV having detachable compartments. In other implementations, the low charge EV 502 is not a compartmentalized EV.

In any event, the low charge EV 502 may broadcast a notification 512 to EVs within a threshold radius of the low charge EV 502. For example, the low charge EV 502 may broadcast the notification 512 via a V2V communication, where EVs within communication range of the low charge EV 502 may receive the notification 512. In other implementations, the low charge EV 502 may transmit the notification 512 to the remote server device 186. The notification 512 may include an indication of the current location of the low charge EV 502. The remote server device 186 may also receive location information from other EVs and may forward the notification 512 to a subset of the EVs having current locations within a threshold radius of the low charge EV 502.

The notification may also include an indication that the low charge EV 502 has less than a threshold amount of charge remaining, an indication of the route for the low charge EV 502 to travel to the destination, and/or an indication of the destination.

Another EV 504 having an amount of charge remaining which is above the threshold amount of charge (also referred to herein as a "high charge EV") may receive the notification 512 and may determine a meeting location for the low charge EV 502 to hand off the load 510 to the high charge EV 504. In some embodiments, the high charge EV 504 may determine the meeting location as the current location of the low charge EV 502. In other embodiments, the high charge EV 504 may determine the meeting location as a location along the route for the low charge EV 502 to travel to the destination. For example, the high charge EV 504 may determine the meeting location as a waypoint along the low charge EV's 502 route which is closest to the current location of the high charge EV 504 when the low charge EV 502 can reach the waypoint without running out of power. More generally, the high charge EV 504 may determine the meeting location based upon any suitable combination of the current location of the low charge EV 502, waypoints along the route for the low charge EV 502 to travel to the destination, the current location of the high charge EV 504, and/or the amount of charge remaining in the low charge EV 502.

Then the high charge EV 504 may transmit a response message 514 to the low charge EV 502 indicating that the high charge EV 504 will pick up the load 510 from the meeting location and/or deliver the load to the destination. In some implementations, the high charge EV 504 may transmit the response message 514 in response to identifying a meeting location which is within a threshold distance of the current location of the high charge EV 504.

In other implementations, the remote server device 186 may determine the meeting location based upon any suitable combination of the current location of the low charge EV 502, waypoints along the route for the low charge EV 502 to travel to the destination, the current location of the high charge EV 504, and/or the amount of charge remaining in the low charge EV 502. The remote server device 186 may then transmit a first request to the high charge EV 504 to pick up the load 510 at the meeting location and may transmit a second request to the low charge EV 502 to drop off the load 510 at the meeting location.

In any event, the low charge EV 502 may receive the response message 514 and may transmit an indication to the high charge EV 504 accepting the request to drop off the load 510 at the meeting location. In some implementations, the low charge EV 502 may determine that the meeting location is acceptable in response to determining that the low charge EV 502 will reach the meeting location without running out of power based upon the amount of charge remaining in the low charge EV 502. In other scenarios, the low charge EV 502 may reject the request and may request a new meeting location and/or may provide a different meeting location. The high charge EV 504 may then accept the different meeting location or may provide yet another proposed meeting location.

In response to agreeing to a meeting location, the low and high charge EVs 502, 504 may travel to the meeting location. When the low and high charge EVs 502, 504 are fully autonomous, the on-board computers in the respective EVs 502, 504 may obtain routes (e.g., from the remote server device 186) for traveling from their respective current locations to the meeting location. Then the on-board computers may send control signals to the respective EVs 502, 504, and more specifically, the steering, braking, and throttling components within the respective EVs 502, 504 to cause the respective EVs 502, 504 to travel to the meeting location.

Figure 5B:
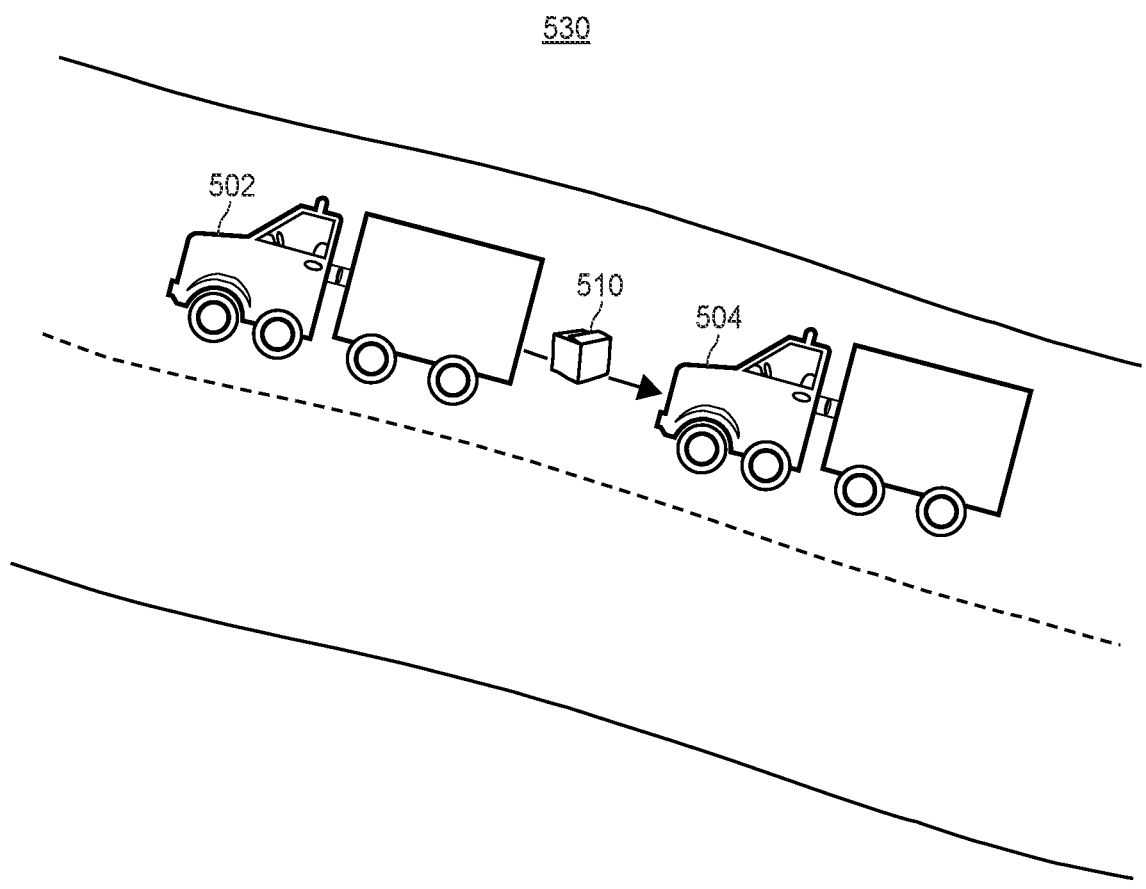

FIG. 5B illustrates an example scenario 530 where the low and high charge EVs 502, 504 reach the meeting location. Upon reaching the meeting location, the low charge EV 502 may hand off or deliver the load 510 to the high charge EV 504. In some implementations, such as when the low charge EV 502 is a fully autonomous vehicle, an on-board computer at the low charge EV 502 may send control signals to a back door or trunk of the low charge EV to cause the back door or trunk to open for transferring the load 510. The high charge EV 504 may also position itself so that back door or trunk of the high charge EV 504 is adjacent to the back door or trunk of the low charge EV 502. An on-board computer at the high charge EV 504 may send control signals to the back door or trunk of the high charge EV to cause the back door or trunk to open for receiving the load 510.

Also in some implementations, the low charge EV 502 may include a robotic arm for picking up the load 510 in the low charge EV 502 and dropping off the load 510 into the high charge EV 504 via the back door or trunk. In other implementations, the low charge EV 502 may automatically slide out a flat surface that extends from the back door or trunk of the low charge EV 502 to the back door or trunk of the high charge EV 504. The low charge EV 502 may include an electrically controlled mechanism for sliding out and/or retracting the flat surface from the back door or trunk of the low charge EV 502. Then the robotic arm may push the load 510 across the flat surface until the load 510 reaches the back door or trunk of the high charge EV 502.

The low charge EV 502 may then provide control signals to the flat surface to retract the flat surface back into the low charge EV 502. The low and high charge EVs 502, 504 may also send control signals to close the back doors or trunks of the respective EVs 502, 504. In other implementations, a human operator may transfer the load 510 from the low charge EV 502 to the high charge EV 504.

Figure 5C:
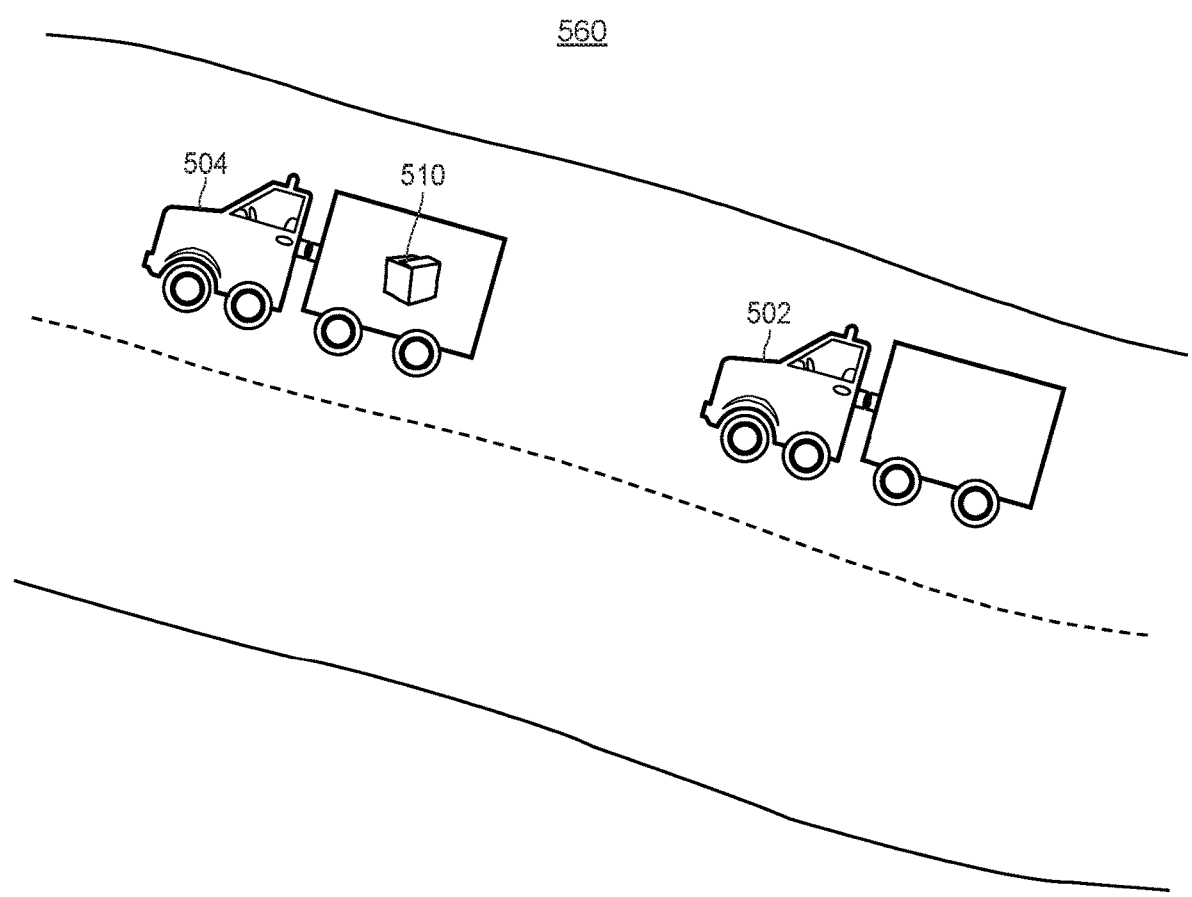

FIG. 5C illustrates an example scenario 560 after the load 510 has been transferred from the low charge EV 502 to the high charge EV 504. In this scenario 560, the high charge EV 504 may obtain a route (e.g., from the remote server device 186) for traveling from the meeting location to the destination location for the load 510. Then the on-board computer for the high charge EV 504 may send control signals to the high charge EV 504, and more specifically, the steering, braking, and throttling components within the high charge EV 504 to cause the high charge EV 504 to travel to the destination location. Upon reaching the destination location, the high charge EV 504 may deliver the load 510 to the recipient. The low charge EV 502 may pull over to the side of the road and wait for emergency services to arrive to tow the low charge EV 502 or provide a temporary charge to the low charge EV 502.

While the example scenario illustrated in FIGS. 5A-5C includes a delivery hand off procedure between two EVs 502, 504, this is merely one example embodiment for ease of illustration only. The delivery hand off procedure may include any suitable number of EVs for transporting a load to a destination. For example, a first EV may transport a load for a first portion of a route, and may transfer the load to a second EV which may transport the load for a second portion of the route. The second EV may then transfer the load to a third EV which may transport the load for a third portion of the route. The third EV may then transfer the load to an nth EV which may transport the load for an nth portion of the route and may arrive at the destination.

Exemplary Power Transfer Method

Figure 6:
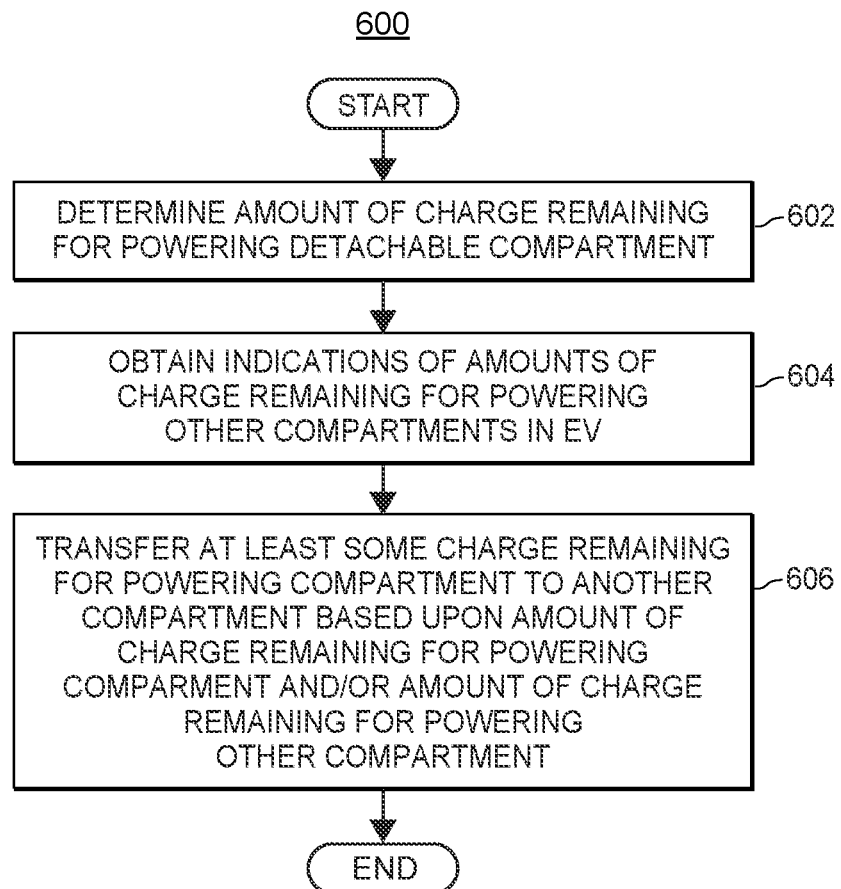
FIG. 6 illustrates a flow diagram of an exemplary power transfer method for transferring power between compartments of an EV.

FIG. 6 illustrates a flow diagram of an exemplary power transfer method 600 for transferring power between compartments of an EV 100. In some embodiments, the power transfer method 600 may be implemented on the on-board computer 106-136 within a compartment 110-140 of the EV 100.

The power transfer method 600 may include determining the amount of charge remaining for powering a detachable compartment 120 of the EV 100 (block 602). Then the on-board computer 116 may obtain indication(s) of amount(s) of charge remaining for powering other compartment(s) 110, 130 in the EV 100 (block 604). The on-board computer 116 may then transfer at least some charge remaining for powering the detachable compartment 120 to another compartment 110 based upon the amount of charge remaining for powering the compartment 120 and/or the amount of charge remaining for powering the other compartment 110 (block 606). Although the method 600 is described with reference to the on-board computer 116 for simplicity, the described method may be easily modified for implementation by other systems or devices, including the mobile device 184.

At block 602, the on-board computer 116 may determine the amount of charge remaining for powering the detachable compartment 120 which houses the on-board computer 116 for example, by receiving an indication of the amount of charge remaining from a charge level sensor in the battery 112. The indication may be a battery percentage or an energy metric. The on-board computer 116 may receive continuous or periodic (e.g., every second, every minute, etc.) updates from the charge level sensor indicating the current amount of charge remaining in the battery 112.

At block 604, the on-board computer 116 may obtain indication(s) of amount(s) of charge remaining for powering other compartment(s) 110, 130 in the EV 100. The on-board computer 116 may obtain indications from other compartments 110, 130 which are adjacent to the compartment 120 which houses the on-board computer 116.

At block 606, the on-board computer 116 transfers power to another compartment 110. To transfer power from a first compartment 120 to a second compartment 110, the first compartment 120 may transmits a communication signal via a radio link (e.g., a near field communication (NFC) link) to the second compartment 110 to inductively charge the second compartment 110. The first compartment 120 may include an antenna having a transmit coil and the second compartment 110 may include an antenna having a receive coil. The transmit and receive coils may induce a magnetic field to transfer power from the first compartment to the second compartment 120. To transfer power to a nonadjacent compartment 140, a compartment 120 may transfer power to an adjacent compartment 130 which continues to transfer the power to adjacent compartments until the nonadjacent compartment 140 receives the power.

The on-board computer 116 may transfer power to another compartment 110 in response to determining that the amount of charge remaining in the compartment 120 which houses the on-board computer 112 exceeds a first threshold charge level (e.g., 50% battery power remaining) and/or in response to determining that the amount of charge remaining in another compartment 110 is less than a second threshold charge level (e.g., 20% battery power remaining). Then the on-board computer 116 may transfer power to the other compartment 110 until the other compartment 110 has more power remaining than the second threshold charge level. In another example, the compartment 120 may transfer power to the other compartment 110 until both compartments have the same amount of charge remaining. In yet another example, the compartment 120 may transfer power to adjacent compartments 110, 130 until the compartment 120 and the adjacent compartments 110, 130 each have the same amount of charge remaining. The method 600 may include additional, less, or alternate actions, including those discussed elsewhere herein.

Exemplary Delivery Method

Figure 7:
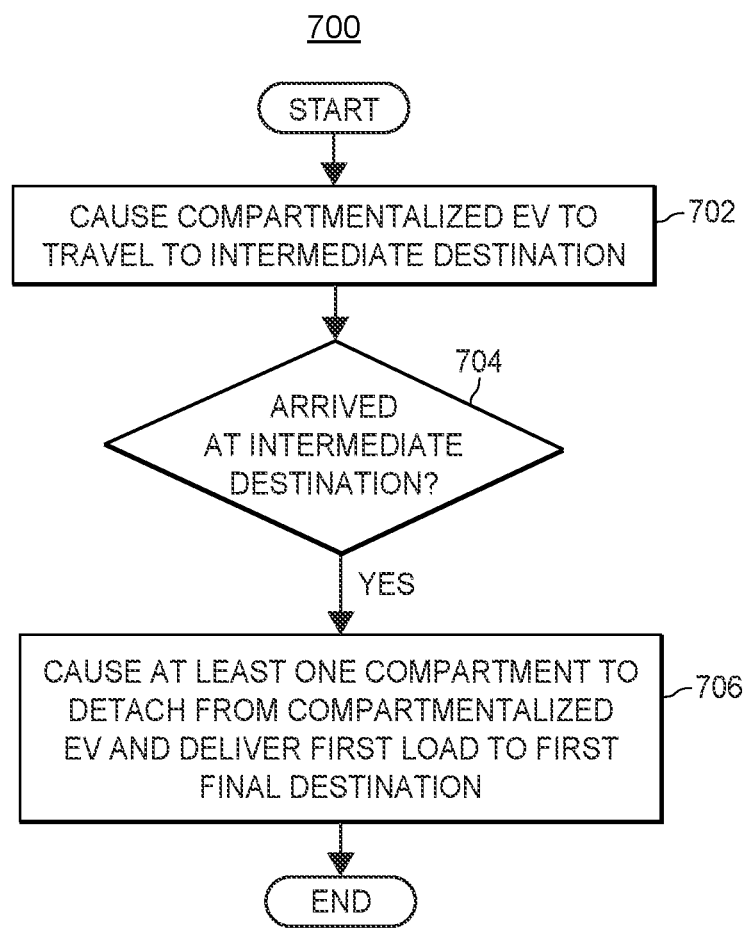
FIG. 7 illustrates another flow diagram of an exemplary delivery method for delivering loads in detachable compartments of a compartmentalized EV to different final destinations.

FIG. 7 illustrates a flow diagram of an exemplary delivery method 700 for delivering loads in detachable compartments 110-140 of a compartmentalized EV 100 to different final destinations 406-410. In some embodiments, the delivery method 700 may be implemented on the on-board computer 106-136 within a compartment 110-140 of the EV 100. The compartmentalized EV 100 and/or each of the compartments 110-140 may be operating in a fully autonomous mode of operation without any control decisions being made by a vehicle operator, excluding navigation decisions such as selection of a destination or route.

In some embodiments, the compartmentalized EV 100 and/or each of the compartments 110-140 may be operating with only passengers who are physically or legally unable to operate the vehicles in a manual or semi-autonomous mode of operation (e.g., children, persons suffering acute illness, intoxicated or otherwise impaired persons, etc.). In other embodiments, the compartmentalized EV 100 and/or each of the compartments 110-140 may be operated manually by a driver or may be operating in a semi-autonomous mode with some control decisions being made by a vehicle operators and others being made autonomously, such as adaptive cruise control.

The delivery method 700 may include causing a compartmentalized EV 100 to travel to an intermediate destination 404 (block 702). In response to determining that the compartmentalized EV 100 has arrived at the intermediate destination 404 (block 704), the on-board computer 106-136 within a compartment 110-140 may cause at least one compartment 120 to detach from the compartmentalized EV 100 and deliver a first load to a first final destination 406 (block 706). Although the method 700 is described with reference to the on-board computer 106-136 for simplicity, the described method may be easily modified for implementation by other systems or devices, including the mobile device 184.

At block 702, the on-board computer 106-136 may cause the compartmentalized EV 100 to travel to an intermediate destination 404. In some implementations, the on-board computer 106-136 in one of the compartments 110-140 may transmit a request to the remote server device 186 for navigation directions from the starting location 402 to the final destinations 406-410. The on-board computer 106-136 may also transmit a request for the remote server device 186 to identify an intermediate destination 404 which is equidistant to each of the final destinations 406-410 or within a threshold radius of each of the final destinations 406-410.

The remote server device 186 may communicate with a map and/or navigation server to identify the intermediate destination 402. The remote server device 186 may also generate a first set of navigation directions for traversing along a first route from the starting location 402 to the intermediate destination 404. Additionally, the remote server device 186 may generate second sets of navigation directions for traveling along respective second routes from the intermediate destination 404 to each of the final destinations 406-410. Then the remote server device 186 may transmit each of the first and second sets of navigation directions to the on-board computer 106-136.

In some implementations, the on-board computer 106-136 may use the first set of navigation directions to cause the compartmentalized EV 100 to travel to the intermediate destination 404. For example, the on-board computer 106-136 may send control signals to the compartmentalized EV 100, and more specifically, the steering, braking, and throttling components within the compartmentalized EV 100 to cause the EV 100 to travel along the first route to the intermediate destination 404.

At block 704, the on-board computer 106-136 may determine that the compartmentalized EV 100 has arrived at the intermediate destination 404. Then at block 706, the on-board computer 106-136 may cause at least one compartment 120 to detach from the compartmentalized EV 100 and deliver a first load to a first final destination 406. In some implementations, the on-board computer 106 may be in a first compartment 110 and may transmit instructions to an on-board computer 136 in a second compartment 140 to detach from the compartmentalized EV 100. In other implementations, the on-board computer 116 may detach the compartment 120 which houses the on-board computer 116 from the compartmentalized EV 100. For example, the on-board computer 116 may de-energize a magnets used to attach the compartment 120 to another compartment 110 or may cause the compartment 120 to accelerate by more than a threshold acceleration in a direction opposite the direction of attachment to the compartmentalized EV 100.

Then the on-board computer 116 may send control signals to the first compartment 120, and more specifically, the steering, braking, and throttling components within the first compartment 120 to cause the first compartment 120 to travel along a route to the first final destination 406.

In some implementations, the on-board computer 106-116 may also cause the compartmentalized EV 100 to deliver a second load to a second final destination. For example, the on-board computer 106-116 may send control signals to the compartmentalized EV 100 and/or at least one of the remaining compartments in the compartmentalized EV 100, and more specifically, the steering, braking, and throttling components within the compartmentalized EV 100 to cause the compartmentalized EV 100 to travel along a route to the second final destination. The method 700 may include additional, less, or alternate actions, including those discussed elsewhere herein.

Exemplary Delivery Hand Off Method

Figure 8:
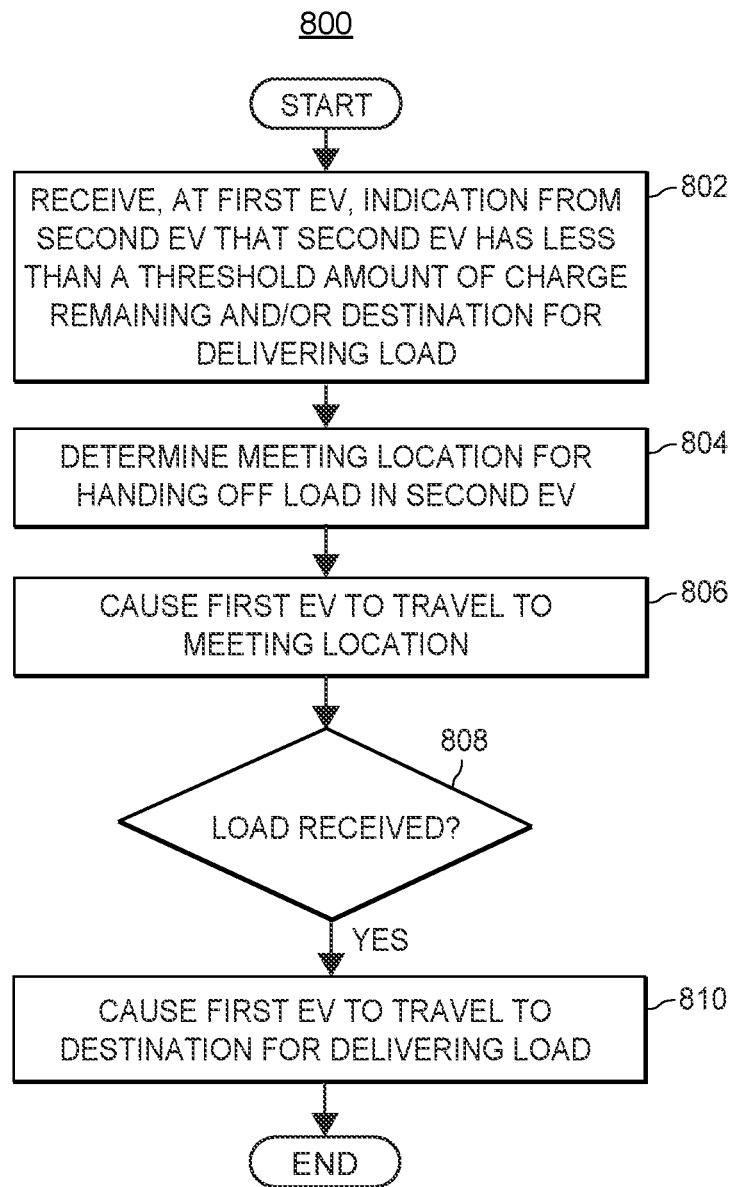
FIG. 8 illustrates yet another flow diagram of an exemplary delivery hand off method for handing off a load when an EV delivering the load is running out of power.

FIG. 8 illustrates a flow diagram of an exemplary delivery hand off method 800 for handing off a load 510 when a second EV 502 delivering the load 510 is running out of power. In some embodiments, the delivery method 800 may be implemented on the on-board computer of the first EV 504 receiving the load. The first EV 502 and/or the second EV 504 may be operating in a fully autonomous mode of operation without any control decisions being made by a vehicle operator, excluding navigation decisions such as selection of a destination or route.

In some embodiments, the first EV 502 and/or the second EV 504 may be operating with only passengers who are physically or legally unable to operate the vehicles in a manual or semi-autonomous mode of operation (e.g., children, persons suffering acute illness, intoxicated or otherwise impaired persons, etc.). In other embodiments, the first EV 502 and/or the second EV 504 may be operated manually by a driver or may be operating in a semi-autonomous mode with some control decisions being made by a vehicle operators and others being made autonomously, such as adaptive cruise control.

The delivery hand off method 800 may include receiving, at a first EV 504, an indication from a second EV 502 that the second EV 502 has less than a threshold amount of charge remaining and/or an indication of a destination for delivering a load 510 in the second EV 502 (block 802). The on-board computer of the first EV 504 may determine a meeting location for handing off the load 510 in the second EV 502 (block 804). The on-board computer of the first EV 504 may cause the first EV 504 to travel to the meeting location (block 806). In response to receiving the load 510 (block 808), the on-board computer of the first EV 504 may cause the first EV 504 to travel to the destination for delivering the load 510 (block 810). Although the method 800 is described with reference to the on-board computer for simplicity, the described method may be easily modified for implementation by other systems or devices, including the mobile device 184.

At block 802, the first EV 504 receives an indication from the second EV 502 that the second EV 502 has less than a threshold amount of charge remaining and/or an indication of a destination for delivering a load 510 in the second EV 502. In some implementations, the second EV 502 may broadcast a notification 512 to EVs within a threshold radius of the second EV 502. For example, the second EV 502 may broadcast the notification 512 via a V2V communication, where EVs within communication range of the second EV 502 may receive the notification 512. In other implementations, the second EV 502 may transmit the notification 512 to the remote server device 186. The notification 512 may include an indication of the current location of the second EV 502. The remote server device 186 may also receive location information from other EVs and may forward the notification 512 to a subset of the EVs having current locations within a threshold radius of the second EV 502.

The notification may also include an indication that the second EV 502 has less a threshold amount of charge remaining, an indication of the route for the second EV 502 to travel to the destination, and/or an indication of the destination.

At block 804, the first EV 504 may determine a meeting location for handing off the load 510 in the second EV 502. The first EV 504 may determine the meeting location based upon any suitable combination of the current location of the second EV 502, waypoints along the route for the second EV 502 to travel to the destination, the current location of the first EV 504, and/or the amount of charge remaining in the second EV 502.

In some implementations, the first EV 504 may transmit a response message 514 to the second EV 502 indicating that the first EV 504 will pick up the load 510 from the meeting location and/or deliver the load 510 to the destination.

In other implementations, the remote server device 186 may determine the meeting location based upon any suitable combination of the current location of the second EV 502, waypoints along the route for the second EV 502 to travel to the destination, the current location of the first EV 504, and/or the amount of charge remaining in the second EV 502. The remote server device 186 may then transmit a first request to the first EV 504 to pick up the load 510 at the meeting location and may transmit a second request to the second EV 502 to drop off the load 510 at the meeting location.

In any event, the second EV 502 may receive the response message 514 and may transmit an indication to the first EV 504 accepting the request to drop off the load 510 at the meeting location. In some implementations, the second EV 502 may determine that the meeting location is acceptable in response to determining that the second EV 502 will reach the meeting location without running out of power based upon the amount of charge remaining in the second EV 502.

At block 806, the first EV 504 may travel to the meeting location. For example, the on-board computer in the first EV 504 may obtain a route (e.g., from the remote server device 186) for traveling from its current locations to the meeting location. Then the on-board computer may send control signals to the first EV 504, and more specifically, the steering, braking, and throttling components within the first EV 504 to cause the first EV 504 to travel to the meeting location.

At block 808, the first EV 504 may receive the load 510 from the second EV 502. In some implementations, such as when the second EV 502 is a fully autonomous vehicle, an on-board computer at the second EV 502 may send control signals to a back door or trunk of the second EV to cause the back door or trunk to open for transferring the load 510. The first EV 504 may also position itself so that back door or trunk of the first EV 504 is adjacent to the back door or trunk of the second EV 502. An on-board computer at the first EV 504 may send control signals to the back door or trunk of the first EV 504 to cause the back door or trunk to open for receiving the load 510. Also in some implementations, the second EV 502 may include a robotic arm for picking up the load 510 in the second EV 502 and dropping off the load 510 into the first EV 504 via the back door or trunk. In other implementations, a human operator may transfer the load 510 from the second EV 502 to the first EV 504.

At block 810, the first EV 504 may travel to the destination for delivering the load 510. In some implementations, the first EV 504 may obtain a route (e.g., from the remote server device 186) for traveling from the meeting location to the destination location for the load 510. Then the on-board computer for the first EV 504 may send control signals to the first EV 504, and more specifically, the steering, braking, and throttling components within the first EV 504 to cause the first EV 504 to travel to the destination location. Upon reaching the destination location, the first EV 504 may deliver the load 510 to the recipient. The method 800 may include additional, less, or alternate actions, including those discussed elsewhere herein.

Exemplary Drone Swarm

Figure 9:
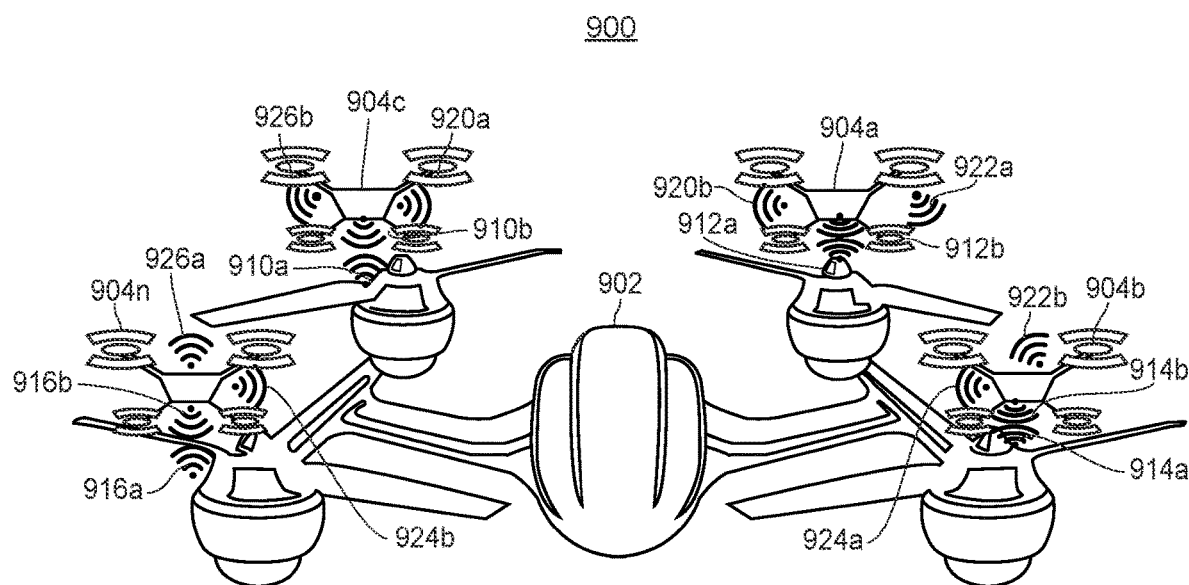
FIG. 9 illustrates an exemplary swarm of unmanned aerial vehicles (UAVs) or drones including a mothership drone coupled to other drones.

FIG. 9 illustrates an exemplary drone swarm 900 including several drones 902-904*n*. For example, the drones 902-904*n* may travel together in a swarm 900 to deliver loads to the same geographic area (e.g., the same city, the same neighborhood, the same suburb, the same town, etc.) but different destinations within the geographic area. This may save power for the drones 902-904*n* by spreading the power out across each of the drones 902-904*n* in the swarm 900. Additionally, each drone 902-904*n* may not have to control propulsion. Instead, one drone 902 may perform most of the control while carrying the other attached drones 904a-904n along.

Each drone 902-904n may include a processor, a memory, a sensor array, a communication unit, a cargo bay (e.g., for storing loads to be delivered to various destinations), and/or a power supply such as a battery. The communication unit may be configured to support any suitable number and/or type of communication protocols to facilitate communications between the drone 902-904n and other drones 902-904n in the swarm and/or the remote server device 186.

In some implementations, the drones 902-904n may navigate autonomously or with minimal assistance from one or more persons. For example, the swarm 900 may receive instructions (e.g., from the remote server device 186) to travel along a first route to an intermediate destination, and for each individual drone 902-904n or a subset of the drones 902-904n to travel along second routes to different final destinations. The drones 902-904n in the swarm 900 may navigate autonomously to the intermediate destination 902-904n and/or the respective final destinations.

In some implementations, the drones 902-904n may include a hierarchy in which at least one of the drones 902 acts as a "mothership" drone to exert control over the other drones 904a-904n. The mothership drone 902 may carry the other drones 904a-904n to an intermediate destination and the other drones 904a-904n may detach from the mothership drone and/or exit the cargo bay of the mothership drone 902 and travel to different final destinations to deliver respective loads. In some implementations, the mothership drone 902 may also travel to a final destination to deliver a load stored in the cargo bay of the mothership drone 902.

Each of the drones 904a-904n may attach to the mothership drone 902 for example, via magnets on an external surface of the mothership drone 902 and on external surfaces of each of the other drones 904a-904n. In other implementations, the mothership drone 902 may be layered with a magnetic coating or may include magnetic materials to attach to the other drones 904a-904n which may also be layered with a magnetic coating or may include magnetic materials.

The magnets may be permanent magnets or electromagnets. In embodiments where the magnets are electromagnets, the processor within a drone 902-904n may send a control signal to energize the magnet for the drone 902-904n. To detach from another drone 902-904n such as the mothership drone 902, the processor may stop sending an electric signal to the magnet to de-energize the magnet. Then the magnet may no longer attach to the magnet for the mothership drone 902.

In other implementations, such as when the magnets are permanent magnets, a drone 904a-904n may accelerate by more than a threshold acceleration in a direction opposite the direction of attachment to the mothership drone 902 to detach from the swarm 900. The threshold acceleration may correspond to a force which is greater than the force of magnetic attraction of the magnets to separate the drone 904a-904n from the mothership drone 902. For example, the bottom of the drone 904a-904n may be attached at the bottom to an external surface of the mothership drone 902. To detach from the mothership drone 902, the drone 904a-904n may accelerate upwards away from the attachment by more than the threshold acceleration.

In yet other implementations, the drones 904a-904n may be stored in the cargo bay of the mothership drone 902 without using magnets to attach to the mothership drone 902. In still other implementations, the drones 904a-904n may not use magnets to attach to the mothership drone 902 or be stored within the cargo bay of the mothership drone 902. Instead, the drones 902-904n may fly within a threshold distance of each other, and/or may be communicatively coupled to each other and within range to transfer power amongst each other.

Similar to the compartmentalized EV 100, the drones 902-904n within the swarm may share power amongst the respective batteries when for example, one drone 902 is performing most of the control (e.g., the mothership drone 902) and the others 904a-904n are being carried along by being attached to the mothership drone 902 and/or being stored in the cargo bay of the mothership drone 902. Accordingly, the drones 902-904n may prevent any one drone 902-904n from draining its battery while they are attached.

To transfer power amongst each other, the drones 902-904n may transmit requests for the amount of charge remaining in the batteries in each respective drone 902-904n. For example, the processor in each drone 902-904n may transmit communications to each other requesting charge statuses from the other drones 902-904n and receive responses to the requests.

In some implementations, one drone 902 may act as a primary drone 902 and may receive the charge statuses from each of the other drones 904a-904n. Then the primary drone 902 may identify drones in which to transfer power based upon the amount of charge remaining in another drone 904a-904n and/or the amount of charge remaining in the primary drone 902. For example, the primary drone 902 may identify drones 902-904n having more than a first threshold charge level (e.g., 50% battery power remaining) and drones 902-904n having less than a second threshold charge level (e.g., 20% battery power remaining). The primary drone 902 may transmit instructions to the drones 902-904n having more than the first threshold charge level to transfer power to the drones 902-904n having less than the second threshold charge level.

In other implementations, the primary drone 902 may aggregate the total amount of charge remaining across the drones 902-904n and divide the total amount of charge by the number of drones 902-904n to determine the average amount of charge remaining. Then the primary drone 902 may transmit instructions to the drones 902-904n to transfer power between the drones 902-904n until each of the drones 902-904n has the average amount of charge remaining, so that each of the drones 902-904n has the same amount of charge remaining.

In yet other implementations, one drone 902 does not act as a primary drone. Instead, each drone 902-904n receives charge statuses from the other drones 902-904n. Then a particular drone 902 may determine whether any of the other drones 904a-904n has less power remaining than the second threshold charge level. If the drone 902 has more power remaining than the first threshold charge level and another drone 904a-904n has less power remaining than the second threshold charge level, the drone 902 transfers power to the other drone 904a-904n for example, until the other drone 904a-904n has more power remaining than the second threshold charge level. In another example, the drone 902 transfers power to the other drones 904a-904n until both drones have the same amount of charge remaining. In some implementations, multiple drones 902, 904a may transfer power to the same drone 904b reducing the amount of power that each drone 902, 904a transfers.

In any event, to transfer power from a first drone 902 to a second drone 904a, the first drone 902 transmits a communication signal 912a via a radio link (e.g., a near field communication (NFC) link) to the second drone 904a to inductively charge the second drone 904a. The first drone 902 includes an antenna having a transmit coil and the second drone 904a includes an antenna having a receive coil. The transmit and receive coils may induce a magnetic field to transfer power from the first drone 902 to the second drone 904a. Each drone 902-904n may transmit communication signals 912a-926b via radio links, such as NFC links to inductively charge other drones 902-904n in the swarm 900.

While the swarm 900 includes one mothership drone 902 and four other drones 904a-904n, this is merely one exemplary embodiment for ease of illustration only. A swarm 900 may include any suitable number of mothership drones 902 or may not include any mothership drones 902 and/or may include any suitable number of other drones 904a-904n.

Exemplary Drone Power Transfer Method

Figure 10:
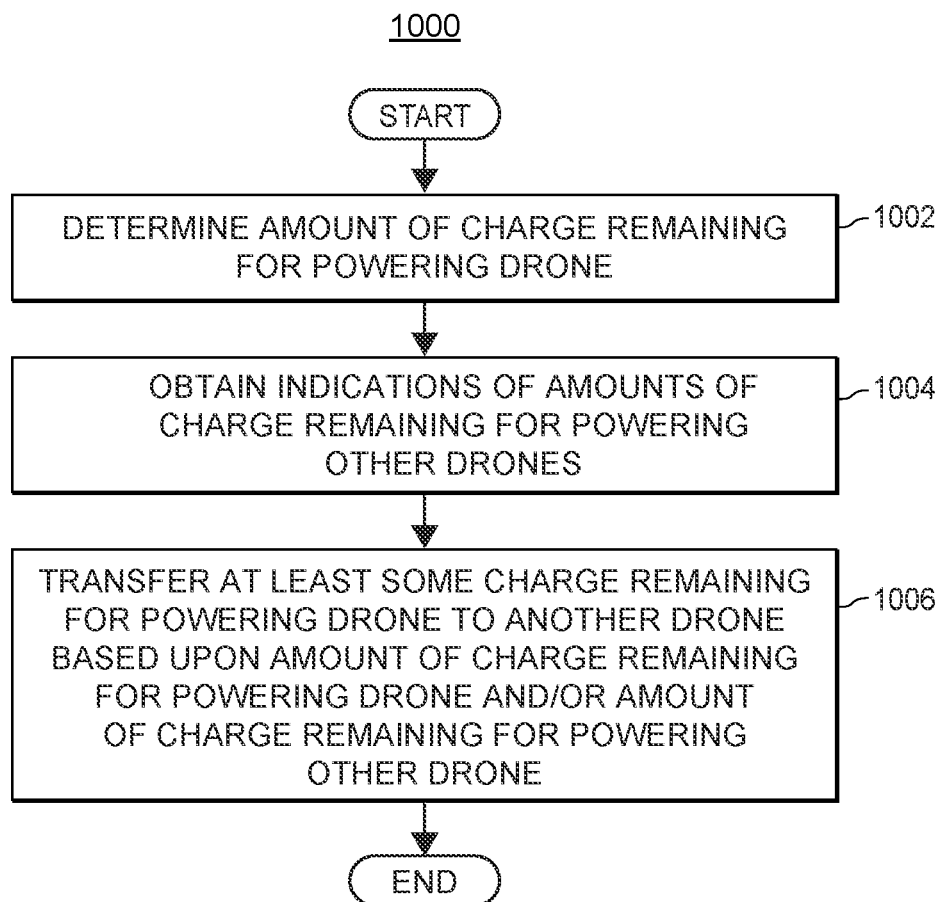
FIG. 10 illustrates a flow diagram of an exemplary power transfer method for transferring power between drones within a swarm.

FIG. 10 illustrates a flow diagram of an exemplary drone power transfer method 1000 for transferring power between drones 902-904n within a swarm 900. In some embodiments, the power transfer method 1000 may be implemented by the processor within a drone 902-904n of the swarm 900.

The drone power transfer method 1000 may include determining the amount of charge remaining for powering a drone 902 of the swarm 900 (block 1002). Then the processor in the drone 902 may obtain indication(s) of amount(s) of charge remaining for powering other drones 904a-904n in the swarm 900 (block 1004). The processor may then transfer at least some charge remaining for powering the drone 902 to another drone 904a-904n based upon the amount of charge remaining for powering the drone 902 and/or the amount of charge remaining for powering the other drone 904a-904n (block 1006).

At block 1002, the processor may determine the amount of charge remaining for powering the drone 902 which houses the processor for example, by receiving an indication of the amount of charge remaining from a charge level sensor in the battery. The indication may be a battery percentage or an energy metric. The processor may receive continuous or periodic (e.g., every second, every minute, etc.) updates from the charge level sensor indicating the current amount of charge remaining in the battery.

At block 1004, the processor may obtain indication(s) of amount(s) of charge remaining for powering other drones 904a-904n in the swarm 900.

At block 1006, the processor transfers power to another drone 904a-904n. To transfer power from a first drone 902 to a second drone 904a, the first drone 902 may transmits a communication signal via a radio link (e.g., a near field communication (NFC) link) to the second drone 904a to inductively charge the second drone 904a.

The processor may transfer power to another drone 904a-904n in response to determining that the amount of charge remaining in the drone 902 which houses the processor exceeds a first threshold charge level (e.g., 50% battery power remaining) and/or in response to determining that the amount of charge remaining in another drone 904a-904n is less than a second threshold charge level (e.g., 20% battery power remaining). Then the processor may transfer power to the other drone 904a-904n until the other drone 904a-904n has more power remaining than the second threshold charge level. In another example, the drone 902 may transfer power to the other drone 904a-904n until both drones have the same amount of charge remaining. The method 1000 may include additional, less, or alternate actions, including those discussed elsewhere herein.

Other Matters

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules. Moreover, the systems and methods described herein are directed to an improvement to computer functionality and improve the functioning of conventional computers.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method for handing off a load when an electric vehicle (EV) delivering the load is running out of power, the method comprising:
   receiving, by one or more processors in a first EV having one or more autonomous operation features, a message from a second EV that the second EV has less than a threshold amount of charge remaining, and a destination for delivering a load in the second EV in response to the second EV broadcasting a notification to EVs within a threshold radius of the second EV;
   determining, by the one or more processors, a meeting location for handing off the load in the second EV by identifying a waypoint along a route for the second EV which is closest to a current location of the first EV;
   receiving, by the one or more processors, a message from the second EV accepting the meeting location in response to the second EV determining that the second EV will reach the meeting location without running out of power based upon an amount of charge remaining in the second EV;
   causing, by the one or more processors, the first EV to travel to the meeting location; and
   in response to obtaining the load from the second EV, causing, by the one or more processors, the first EV to travel to the destination for delivering the load.

2. The computer-implemented method of claim 1, further comprising:
   transmitting, by the one or more processors, a response message to the second EV indicating that the first EV will pick up the load from the meeting location and deliver the load to the destination.

3. The computer-implemented method of claim 2, wherein the response message is transmitted in response to determining that the first EV is within a threshold distance of the meeting location.

4. The computer-implemented method of claim 1, wherein the message that the second EV has less than the threshold amount of charge remaining is received via a vehicle-to-vehicle (V2V) communication.

5. The computer-implemented method of claim 1, wherein causing the first EV to travel to the meeting location includes:
   obtaining, by the one or more processors, a route from the current location of the first EV to the meeting location; and
   sending, by the one or more processors, control signals to cause the first EV to travel along the route to the meeting location.

6. The computer-implemented method of claim 1, wherein causing the first EV to travel to the destination includes:
   obtaining, by the one or more processors, a route from the meeting location to the destination; and
   sending, by the one or more processors, control signals to cause the first EV to travel along the route to the destination.

7. The computer-implemented method of claim 1, further comprising:
   sending, by the one or more processors, control signals to cause a door to the first EV or trunk of the first EV to open for receiving the load.

8. A computer system configured to hand off a load when an electric vehicle (EV) delivering the load is running out of power, the computer system comprising one or more local or remote processors, transceivers, and/or sensors configured to:
   receive, at a first EV having one or more autonomous operation features, a message from a second EV that the second EV has less than a threshold amount of charge remaining and a destination for delivering a load in the second EV in response to the second EV broadcasting a notification to EVs within a threshold radius of the second EV;
   determine a meeting location for handing off the load in the second EV by identifying a waypoint along a route for the second EV which is closest to a current location of the first EV;
   receive a message from the second EV accepting the meeting location in response to the second EV determining that the second EV will reach the meeting location without running out of power based upon an amount of charge remaining in the second EV;
   cause the first EV to travel to the meeting location; and
   in response to obtaining the load from the second EV, cause the first EV to travel to the destination for delivering the load.

9. The computer system of claim 8, wherein the computer system is further configured to:
   transmit a response message to the second EV indicating that the first EV will pick up the load from the meeting location and deliver the load to the destination.

10. The computer system of claim 9, wherein the response message is transmitted in response to determining that the first EV is within a threshold distance of the meeting location.

11. The computer system of claim 8, wherein the message that the second EV has less than the threshold amount of charge remaining is received via a vehicle-to-vehicle (V2V) communication.

12. The computer system of claim 8, wherein to cause the first EV to travel to the meeting location, the computer system is configured to:
   obtain a route from the current location of the first EV to the meeting location; and
   send control signals to cause the first EV to travel along the route to the meeting location.

13. The computer system of claim 8, wherein to cause the first EV to travel to the destination, the computer system is configured to:
   obtain a route from the meeting location to the destination; and
   send control signals to cause the first EV to travel along the route to the destination.

14. The computer system of claim 8, wherein the computer system is further configured to:

send control signals to cause a door to the first EV or trunk of the first EV to open for receiving the load.

* * * * *